US010529971B2

(12) United States Patent
Visco et al.

(10) Patent No.: US 10,529,971 B2
(45) Date of Patent: *Jan. 7, 2020

(54) SAFETY ENHANCED LI-ION AND LITHIUM METAL BATTERY CELLS HAVING PROTECTED LITHIUM ELECTRODES WITH ENHANCED SEPARATOR SAFETY AGAINST DENDRITE SHORTING

(71) Applicant: PolyPlus Battery Company, Berkeley, CA (US)

(72) Inventors: Steven J. Visco, Berkeley, CA (US); Bruce D. Katz, Moraga, CA (US); Yevgeniy S. Nimon, Danville, CA (US); Lutgard C. De Jonghe, Lafayette, CA (US)

(73) Assignee: PolyPlus Battery Company, Berkeley, CA (US)

( * ) Notice: Subject to any disclaimer, the term of this patent is extended or adjusted under 35 U.S.C. 154(b) by 260 days.

This patent is subject to a terminal disclaimer.

(21) Appl. No.: 15/487,364

(22) Filed: Apr. 13, 2017

(65) Prior Publication Data

US 2017/0346060 A1    Nov. 30, 2017

Related U.S. Application Data

(60) Continuation of application No. 15/150,231, filed on May 9, 2016, now Pat. No. 9,666,850, which is a
(Continued)

(51) Int. Cl.
*H01M 4/13* (2010.01)
*H01M 2/16* (2006.01)
(Continued)

(52) U.S. Cl.
CPC .......... *H01M 2/1673* (2013.01); *H01G 11/06* (2013.01); *H01G 11/52* (2013.01);
(Continued)

(58) Field of Classification Search
None
See application file for complete search history.

(56) References Cited

U.S. PATENT DOCUMENTS

| 3,343,988 A | 9/1967 | Friend |
| 3,528,856 A | 9/1970 | Ovshinsky |

(Continued)

FOREIGN PATENT DOCUMENTS

| EP | 111213 | 11/1983 |
| EP | 111214 | 11/1983 |

(Continued)

OTHER PUBLICATIONS

EP Application No. 03 809 186.4, Decision to Refuse, dated Jul. 13, 2017, 52 pages.
(Continued)

*Primary Examiner* — Tracy M Dove
(74) *Attorney, Agent, or Firm* — Weaver Austin Villeneuve & Sampson LLP

(57) ABSTRACT

Active metal and active metal intercalation electrode structures and battery cells having ionically conductive protective architecture including an active metal (e.g., lithium) conductive impervious layer separated from the electrode (anode) by a porous separator impregnated with a non-aqueous electrolyte (anolyte). This protective architecture prevents the active metal from deleterious reaction with the environment on the other (cathode) side of the impervious layer, which may include aqueous or non-aqueous liquid electrolytes (catholytes) and/or a variety electrochemically active materials, including liquid, solid and gaseous oxidizers. Safety additives and designs that facilitate manufacture are also provided.

20 Claims, 6 Drawing Sheets

Related U.S. Application Data continuation of application No. 14/156,267, filed on Jan. 15, 2014, now Pat. No. 9,368,775, which is a continuation-in-part of application No. 13/929,653, filed on Jun. 27, 2013, now Pat. No. 8,828,580, which is a continuation of application No. 13/615,351, filed on Sep. 13, 2012, now Pat. No. 8,501,339, which is a continuation of application No. 12/888,154, filed on Sep. 22, 2010, now Pat. No. 8,293,398, which is a continuation of application No. 11/824,597, filed on Jun. 28, 2007, now Pat. No. 7,829,212, which is a division of application No. 10/824,944, filed on Apr. 14, 2004, now Pat. No. 7,282,295.

(60) Provisional application No. 60/548,231, filed on Feb. 27, 2004, provisional application No. 60/542,532, filed on Feb. 6, 2004, provisional application No. 61/763,412, filed on Feb. 11, 2013.

(51) Int. Cl.

| | |
|---|---|
| *H01M 4/36* | (2006.01) |
| *H01G 11/06* | (2013.01) |
| *H01G 11/52* | (2013.01) |
| *H01G 11/58* | (2013.01) |
| *H01M 4/62* | (2006.01) |
| *H01M 4/587* | (2010.01) |
| *H01M 10/052* | (2010.01) |
| *H01M 10/0562* | (2010.01) |
| *H01M 8/065* | (2016.01) |
| *H01M 10/36* | (2010.01) |
| *H01M 6/34* | (2006.01) |
| *H01M 12/08* | (2006.01) |
| *H01M 4/02* | (2006.01) |

(52) U.S. Cl.
CPC .......... *H01G 11/58* (2013.01); *H01M 2/1686* (2013.01); *H01M 4/13* (2013.01); *H01M 4/366* (2013.01); *H01M 4/628* (2013.01); *H01M 4/587* (2013.01); *H01M 6/34* (2013.01); *H01M 8/065* (2013.01); *H01M 10/052* (2013.01); *H01M 10/0562* (2013.01); *H01M 10/36* (2013.01); *H01M 12/08* (2013.01); *H01M 2004/027* (2013.01); *H01M 2300/0085* (2013.01); *Y02E 60/122* (2013.01); *Y02E 60/128* (2013.01); *Y02E 60/13* (2013.01)

(56) References Cited

U.S. PATENT DOCUMENTS

| | | |
|---|---|---|
| 3,607,417 A | 9/1971 | McRae et al. |
| 3,615,835 A | 10/1971 | Ovshinsky |
| 3,625,769 A | 12/1971 | Lyall |
| 3,679,540 A | 7/1972 | Zimmerman et al. |
| 3,703,415 A | 11/1972 | Mitoff et al. |
| 3,783,026 A | 1/1974 | Kordesch |
| 3,912,536 A | 10/1975 | Galli |
| 3,953,566 A | 4/1976 | Gore |
| 3,976,509 A | 8/1976 | Tsai et al. |
| 4,007,057 A | 2/1977 | Littauer et al. |
| 4,091,182 A | 5/1978 | Farrington |
| 4,100,238 A | 7/1978 | Shinomura |
| 4,162,202 A | 7/1979 | Dey |
| 4,163,084 A | 7/1979 | Tsai et al. |
| 4,187,390 A | 2/1980 | Gore |
| 4,210,707 A | 7/1980 | Farrington |
| 4,402,995 A | 9/1983 | Fleischer |
| 4,405,416 A | 9/1983 | Raistrick |
| 4,405,995 A | 9/1983 | Shirai |
| 4,414,293 A | 11/1983 | Joy et al. |
| 4,429,000 A | 1/1984 | Naka et al. |
| 4,504,561 A | 3/1985 | Winsel |
| 4,539,256 A | 9/1985 | Shipman |
| 4,726,989 A | 2/1988 | Mrozinski |
| 4,828,942 A | 5/1989 | Licht |
| 4,833,048 A | 5/1989 | Dejonghe et al. |
| 4,916,036 A | 4/1990 | Cheiky |
| 4,917,974 A | 4/1990 | Visco et al. |
| 4,981,672 A | 1/1991 | De Neufville et al. |
| 4,985,317 A | 1/1991 | Adachi et al. |
| 5,002,843 A | 3/1991 | Cieslak et al. |
| 5,035,963 A | 7/1991 | Plichta |
| 5,100,523 A | 3/1992 | Helms et al. |
| 5,108,856 A | 4/1992 | Shuster |
| 5,162,172 A | 11/1992 | Kaun |
| 5,162,175 A | 11/1992 | De Jonghe et al. |
| 5,166,011 A | 11/1992 | Rao et al. |
| 5,198,081 A | 3/1993 | Kanoh et al. |
| 5,213,908 A | 5/1993 | Hagedorn |
| 5,290,592 A | 3/1994 | Izuchi et al. |
| 5,314,765 A | 5/1994 | Bates |
| 5,336,384 A | 8/1994 | Tsou et al. |
| 5,338,625 A | 8/1994 | Bates et al. |
| 5,342,710 A | 8/1994 | Koksbang |
| 5,387,479 A | 2/1995 | Koksbang |
| 5,409,786 A | 4/1995 | Bailey |
| 5,413,881 A | 5/1995 | Licht et al. |
| 5,427,873 A | 6/1995 | Shuster |
| 5,455,126 A | 10/1995 | Bates et al. |
| 5,506,068 A | 4/1996 | Dan et al. |
| 5,510,209 A | 4/1996 | Abraham et al. |
| 5,512,147 A | 4/1996 | Bates et al. |
| 5,516,598 A | 5/1996 | Chu et al. |
| 5,523,179 A | 6/1996 | Chu |
| 5,525,442 A | 6/1996 | Shuster |
| 5,532,077 A | 7/1996 | Chu |
| 5,567,210 A | 10/1996 | Bates et al. |
| 5,569,520 A | 10/1996 | Bates |
| 5,571,600 A | 11/1996 | Licht |
| 5,582,623 A | 12/1996 | Chu |
| 5,597,660 A | 1/1997 | Bates et al. |
| 5,612,152 A | 3/1997 | Bates |
| 5,648,183 A | 7/1997 | Licht et al. |
| 5,648,187 A | 7/1997 | Skotheim |
| 5,652,068 A | 7/1997 | Shuster et al. |
| 5,665,481 A | 9/1997 | Shuster et al. |
| 5,686,201 A | 11/1997 | Chu |
| 5,693,212 A | 12/1997 | Mazanec et al. |
| 5,696,201 A | 12/1997 | Cavalloni et al. |
| 5,702,995 A | 12/1997 | Fu |
| 5,789,108 A | 8/1998 | Chu |
| 5,814,420 A | 9/1998 | Chu |
| 5,882,812 A | 3/1999 | De Jonghe et al. |
| 5,961,672 A | 10/1999 | Skotheim et al. |
| 5,962,171 A | 10/1999 | Boguslaysky et al. |
| 6,017,651 A | 1/2000 | Chu et al. |
| 6,025,094 A | 2/2000 | Visco |
| 6,025,095 A | 2/2000 | Kawamura |
| 6,030,720 A | 2/2000 | Chu et al. |
| 6,030,909 A | 2/2000 | Fu |
| 6,066,417 A | 5/2000 | Cho et al. |
| 6,068,950 A | 5/2000 | Gan |
| 6,096,447 A | 8/2000 | Gan |
| 6,110,236 A | 8/2000 | Chu et al. |
| 6,146,787 A | 11/2000 | Harrup et al. |
| 6,165,644 A | 12/2000 | Chu et al. |
| 6,183,901 B1 | 2/2001 | Ying et al. |
| 6,198,701 B1 | 3/2001 | De Jonghe et al. |
| 6,200,701 B1 | 3/2001 | Gan |
| 6,200,704 B1 | 3/2001 | De Jonghe et al. |
| 6,203,942 B1 | 3/2001 | Gan |
| 6,203,947 B1 | 3/2001 | Peled et al. |
| 6,207,324 B1 | 3/2001 | Licht |
| 6,210,832 B1 | 4/2001 | Chu et al. |
| 6,214,061 B1 | 4/2001 | Visco et al. |
| 6,225,002 B1 | 5/2001 | Chu et al. |
| 6,228,527 B1 | 5/2001 | Medeiros et al. |
| 6,242,135 B1 | 6/2001 | Mushiake |
| 6,248,481 B1 | 6/2001 | Visco et al. |

(56) References Cited

U.S. PATENT DOCUMENTS

| | | |
|---|---|---|
| 6,274,269 B1 | 8/2001 | Gan |
| 6,280,598 B1 | 8/2001 | Barton |
| 6,296,958 B1 | 10/2001 | Pinto et al. |
| 6,315,881 B1 | 11/2001 | Fu |
| 6,358,643 B1 | 3/2002 | Katz et al. |
| 6,358,651 B1 | 3/2002 | Chen et al. |
| 6,376,123 B1 | 4/2002 | Chu |
| 6,391,492 B1 | 5/2002 | Kawakami et al. |
| 6,402,795 B1 | 6/2002 | Chu et al. |
| 6,413,284 B1 | 7/2002 | Chu |
| 6,413,285 B1 | 7/2002 | De Jonghe et al. |
| 6,432,584 B1 | 8/2002 | Visco et al. |
| 6,475,677 B1 | 11/2002 | Inda et al. |
| 6,485,622 B1 | 11/2002 | Fu |
| 6,489,055 B1 | 12/2002 | Ichihashi |
| 6,495,285 B2 | 12/2002 | Gan |
| 6,511,772 B2 | 1/2003 | Gan |
| 6,537,698 B2 | 3/2003 | Gan |
| 6,537,701 B1 | 3/2003 | Chu et al. |
| 6,632,573 B1 | 10/2003 | Nimon et al. |
| 6,723,140 B2 | 4/2004 | Chu et al. |
| 6,733,924 B1 | 5/2004 | Skotheim |
| 6,737,197 B2 | 5/2004 | Chu et al. |
| 6,766,817 B2 | 7/2004 | Da Silva |
| 6,770,187 B1 | 8/2004 | Putter et al. |
| 6,797,428 B1 | 9/2004 | Skotheim |
| 6,835,492 B2 | 12/2004 | Cho et al. |
| 6,911,280 B1 | 6/2005 | De Jonghe et al. |
| 6,955,866 B2 | 10/2005 | Nimon et al. |
| 6,991,662 B2 | 1/2006 | Visco et al. |
| 7,070,632 B1 | 7/2006 | Visco et al. |
| 7,211,351 B2 | 5/2007 | Klaassen |
| 7,211,532 B2 | 5/2007 | Fu |
| 7,247,408 B2 | 7/2007 | Skotheim |
| 7,282,295 B2 | 10/2007 | Visco et al. |
| 7,282,296 B2 | 10/2007 | Visco et al. |
| 7,282,302 B2 | 10/2007 | Visco et al. |
| 7,344,804 B2 | 3/2008 | Klaassen |
| 7,390,591 B2 | 6/2008 | Visco et al. |
| 7,432,017 B2 | 10/2008 | Visco et al. |
| 7,491,458 B2 | 2/2009 | Visco et al. |
| 7,608,178 B2 | 10/2009 | De Jonghe et al. |
| 7,645,543 B2 | 1/2010 | Visco et al. |
| 7,666,233 B2 | 2/2010 | Visco et al. |
| 7,771,870 B2 | 8/2010 | Affinito et al. |
| 7,781,108 B2 | 8/2010 | Visco et al. |
| 7,829,212 B2 | 11/2010 | Visco et al. |
| 7,838,144 B2 | 11/2010 | Visco et al. |
| 7,858,223 B2 | 12/2010 | Visco et al. |
| 7,998,626 B2 | 8/2011 | Visco et al. |
| 8,048,571 B2 | 11/2011 | Visco et al. |
| 8,114,171 B2 | 2/2012 | Visco et al. |
| 8,182,943 B2 | 5/2012 | Visco et al. |
| 8,202,649 B2 | 6/2012 | Visco et al. |
| 8,323,820 B2 | 12/2012 | Visco et al. |
| 8,334,075 B2 | 12/2012 | Visco et al. |
| 8,389,147 B2 | 3/2013 | Visco et al. |
| 8,455,131 B2 | 6/2013 | Visco et al. |
| 8,501,339 B2 | 8/2013 | Visco et al. |
| 8,652,686 B2 | 2/2014 | Visco et al. |
| 8,652,692 B2 | 2/2014 | Visco et al. |
| 8,658,304 B2 | 2/2014 | Visco et al. |
| 8,709,679 B2 | 4/2014 | Visco et al. |
| 8,828,580 B2 | 9/2014 | Visco et al. |
| 9,123,941 B2 | 9/2015 | Visco et al. |
| 9,419,299 B2 | 8/2016 | Visco et al. |
| 9,601,779 B2 | 3/2017 | Visco et al. |
| 9,666,850 B2 | 5/2017 | Visco et al. |
| 2001/0014420 A1 | 8/2001 | Takeuchi et al. |
| 2001/0028977 A1 | 10/2001 | Kazacos et al. |
| 2001/0041294 A1 | 11/2001 | Chu et al. |
| 2002/0012845 A1 | 1/2002 | Choi et al. |
| 2002/0012846 A1 | 1/2002 | Skotheim et al. |
| 2002/0015869 A1 | 2/2002 | Suda |
| 2002/0028389 A1 | 3/2002 | Sonoda et al. |
| 2002/0034688 A1 | 3/2002 | Chu |
| 2002/0068220 A1 | 6/2002 | Wyler |
| 2002/0102465 A1 | 8/2002 | Chen et al. |
| 2002/0106563 A1 | 8/2002 | Okawa |
| 2003/0124433 A1 | 7/2003 | Kim |
| 2003/0190501 A1 | 10/2003 | Rendina |
| 2003/0224234 A1 | 12/2003 | Steele et al. |
| 2004/0081894 A1 | 4/2004 | Nimon |
| 2004/0101761 A1 | 5/2004 | Park et al. |
| 2004/0126653 A1 | 7/2004 | Visco et al. |
| 2004/0142244 A1 | 7/2004 | Visco et al. |
| 2004/0185334 A1 | 9/2004 | Imamoto |
| 2004/0191617 A1 | 9/2004 | Visco et al. |
| 2004/0197641 A1 | 10/2004 | Visco et al. |
| 2005/0095506 A1 | 5/2005 | Klaassen |
| 2005/0100792 A1 | 5/2005 | Visco et al. |
| 2005/0100793 A1 | 5/2005 | De Jonghe et al. |
| 2005/0175894 A1 | 8/2005 | Visco et al. |
| 2005/0186469 A1 | 8/2005 | De Jonghe et al. |
| 2005/0208353 A1 | 9/2005 | Johnson |
| 2006/0046149 A1 | 3/2006 | Yong et al. |
| 2006/0063051 A1 | 3/2006 | Jang |
| 2006/0078790 A1 | 4/2006 | Nimon et al. |
| 2006/0183011 A1 | 8/2006 | Mittelsteadt et al. |
| 2007/0037058 A1 | 2/2007 | Visco et al. |
| 2007/0051620 A1 | 3/2007 | Visco et al. |
| 2007/0087269 A1 | 4/2007 | Inda |
| 2007/0117007 A1 | 5/2007 | Visco et al. |
| 2007/0117026 A1 | 5/2007 | Kumar et al. |
| 2007/0148533 A1 | 6/2007 | Anglin et al. |
| 2007/0172739 A1 | 7/2007 | Visco et al. |
| 2007/0231704 A1 | 10/2007 | Inda |
| 2007/0259234 A1 | 11/2007 | Chua et al. |
| 2008/0038641 A1 | 2/2008 | Visco et al. |
| 2008/0052898 A1 | 3/2008 | Visco et al. |
| 2008/0057386 A1 | 3/2008 | Visco et al. |
| 2008/0057387 A1 | 3/2008 | Visco et al. |
| 2008/0057399 A1 | 3/2008 | Visco et al. |
| 2009/0239152 A1 | 9/2009 | Katoh |
| 2009/0286114 A1 | 11/2009 | Visco et al. |
| 2009/0297935 A1 | 12/2009 | Visco et al. |
| 2009/0311567 A1 | 12/2009 | Visco et al. |
| 2009/0311596 A1 | 12/2009 | Visco et al. |
| 2009/0311603 A1 | 12/2009 | Visco et al. |
| 2009/0311605 A1 | 12/2009 | Visco et al. |
| 2010/0104934 A1 | 4/2010 | Visco et al. |
| 2010/0203383 A1 | 8/2010 | Weppner |
| 2011/0014522 A1 | 1/2011 | Visco et al. |
| 2011/0039144 A1 | 2/2011 | Visco et al. |
| 2011/0053002 A1 | 3/2011 | Yamamura et al. |
| 2011/0244337 A1 | 10/2011 | Ohta et al. |
| 2011/0269007 A1 | 11/2011 | Visco et al. |
| 2011/0269031 A1 | 11/2011 | Visco et al. |
| 2011/0318648 A1 | 12/2011 | Eitouni et al. |
| 2012/0009469 A1 | 1/2012 | Visco et al. |
| 2012/0094188 A1 | 4/2012 | Visco et al. |
| 2012/0169016 A1 | 7/2012 | Hisano et al. |
| 2013/0066025 A1 | 3/2013 | Yang et al. |
| 2013/0122380 A1 | 5/2013 | Visco et al. |
| 2013/0273419 A1 | 10/2013 | Pistorino et al. |
| 2014/0004447 A1 | 1/2014 | Visco et al. |
| 2014/0050994 A1 | 2/2014 | Visco et al. |
| 2014/0057153 A1 | 2/2014 | Visco et al. |
| 2014/0272524 A1 | 9/2014 | Visco et al. |
| 2014/0335392 A1 | 11/2014 | Visco et al. |
| 2015/0024251 A1 | 1/2015 | Visco et al. |
| 2015/0340720 A1 | 11/2015 | Visco et al. |
| 2016/0028063 A1 | 1/2016 | Visco et al. |
| 2016/0351878 A1 | 12/2016 | Visco et al. |
| 2016/0351879 A1 | 12/2016 | Visco et al. |
| 2017/0214055 A1 | 7/2017 | Visco et al. |

FOREIGN PATENT DOCUMENTS

| | | |
|---|---|---|
| EP | 694501 | 1/1996 |
| EP | 838441 | 4/1998 |
| EP | 875951 | 11/1998 |
| EP | 689260 | 4/1999 |
| EP | 1162675 | 12/2001 |

(56) References Cited

FOREIGN PATENT DOCUMENTS

| | | |
|---|---|---|
| EP | 1699104 | 9/2006 |
| EP | 1892780 | 2/2008 |
| JP | 55-081471 | 6/1980 |
| JP | 57-003371 | 1/1982 |
| JP | 57-017568 | 1/1982 |
| JP | 57-103271 | 6/1982 |
| JP | 57-172660 | 10/1982 |
| JP | 62-243247 | 10/1987 |
| JP | 63-198261 | 8/1988 |
| JP | 04-275387 | 9/1992 |
| JP | 05-234578 | 9/1993 |
| JP | 09-320645 | 12/1997 |
| JP | 2001-313025 | 11/2001 |
| JP | 2001-351615 | 12/2001 |
| JP | 2002-513991 | 5/2002 |
| JP | 2002-518796 | 6/2002 |
| JP | 2002-528866 | 9/2002 |
| JP | 2002-289266 | 10/2002 |
| JP | 2003-217662 | 7/2003 |
| JP | 2003-346862 | 12/2003 |
| JP | 2004-504933 | 2/2004 |
| JP | 2005-503920 | 2/2005 |
| KR | 10/2001-00249 | 3/2001 |
| KR | 2001-0043145 | 5/2001 |
| KR | 10-2002-0059419 | 7/2002 |
| WO | 98/28811 | 7/1998 |
| WO | 99/57770 | 11/1999 |
| WO | 99/65101 | 12/1999 |
| WO | 00/51198 | 8/2000 |
| WO | 01/33651 | 5/2001 |
| WO | 01/39302 | 5/2001 |
| WO | 02/50933 | 6/2002 |
| WO | 02/095849 | 11/2002 |
| WO | 2004/036669 | 4/2004 |
| WO | 2005/038953 | 4/2005 |
| WO | 2005/038962 | 4/2005 |
| WO | 2005/083829 | 9/2005 |
| WO | 2007/021717 | 2/2007 |

OTHER PUBLICATIONS

U.S. Appl. No. 15/423,458, Notice of Allowance, dated Sep. 26, 2017.
U.S. Appl. No. 15/149,012, Non-Final Office Action, dated Nov. 27, 2017.
U.S. Appl. No. 15/851,316, filed Dec. 21, 2017, Visco et al.
U.S. Appl. No. 14/292,699, Office Action dated Feb. 1, 2016.
U.S. Appl. No. 14/292,699, Notice of Allowance dated Mar. 14, 2016.
U.S. Appl. No. 14/815,672, Office Action dated Apr. 29, 2016.
U.S. Appl. No. 15/149,012, "Advanced lithium ion batteries based on solid state protected lithium electrodes," Viseo et al., filed May 6, 2016.
U.S. Appl. No. 14/815,672, Notice of Allowance dated May 25, 2016.
U.S. Appl. No. 15/173,303, Office Action dated Oct. 6, 2016.
U.S. Appl. No. 15/173,303, Notice of Allowance dated Nov. 4, 2016.
U.S. Appl. No. 14/809,083, Office Action dated Nov. 18, 2016.
U.S. Appl. No. 12/973,779, Office Action dated Dec. 19, 2012.
U.S. Appl. No. 12/973,779, Office Action dated May 31, 2013.
U.S. Appl. No. 12/973,779, Office Action dated Nov. 29, 2013.
U.S. Appl. No. 14/289,502, Office Action dated May 13, 2016.
JP patent application No. 2014-108250, Notification of Reasons for Rejection dated Feb. 23, 2016.
U.S. Appl. No. 14/809,083, Office Action dated Apr. 4, 2016.
KR patent application No. 10-2013-7020727, Office Action dated May 22, 2014.
U.S. Appl. No. 13/708,540, Notice of Allowance dated May 23, 2014.
U.S. Appl. No. 13/464,835, Office Action dated Jun. 3, 2014.
U.S. Appl. No. 13/929,653, Notice of Allowance dated Jun. 9, 2014.
JP patent application No. 2006-552102, Office Action dated Jul. 15, 2014.
JP patent application No. 2006-552102, Decision to Grant dated Aug. 25, 2014.
U.S. Appl. No. 13/464,835, Office Action dated Jan. 9, 2015.
EP patent application No. 03809186.4, Exam Report dated Mar. 24, 2015.
U.S. Appl. No. 14/449,040, Office Action dated May 19, 2015.
U.S. Appl. No. 14/449,040, Notice of Allowance dated Jul. 1, 2015.
U.S. Appl. No. 13/464,835, Notice of Allowance dated Jul. 7, 2015.
JP patent application No. 2014-108250, Notification of Reasons for Rejection, dated Jun. 16, 2015.
U.S. Appl. No. 14/815,672, Office Action dated Sep. 22, 2015.
BR patent application No. P10415312.0, Search and Exam Report dated Mar. 6, 2014.
International Search Report and Written Opinion dated Oct. 18, 2005 from International Application No. PCT/US2004/033372.
U.S. Appl. No. 11/092,781, Office Action dated Jun. 16, 2006.
U.S. Appl. No. 11/092,781, Office Action dated Feb. 1, 2007.
U.S. Appl. No. 11/092,781, Office Action dated Jun. 25, 2007.
U.S. Appl. No. 11/092,781, Office Action dated Feb. 22, 2008.
U.S. Appl. No. 10/686,189, Office Action dated Oct. 12, 2006.
U.S. Appl. No. 10/686,189, Office Action dated Apr. 11, 2007.
U.S. Appl. No. 10/731,771, Office Action dated Sep. 28, 2006.
U.S. Appl. No. 10/731,771, Office Action dated Mar. 16, 2007.
U.S. Appl. No. 10/772,157, Office Action dated Nov. 1, 2007.
U.S. Appl. No. 10/772,157, Office Action dated Feb. 6, 2008.
U.S. Appl. No. 10/772,157, Office Action dated Jul. 11, 2008.
U.S. Appl. No. 10/772,157, Office Action dated Dec. 30, 2008.
U.S. Appl. No. 11/824,548, Office Action dated Mar. 20, 2008.
U.S. Appl. No. 11/824,548, Office Action dated Jan. 26, 2009.
U.S. Appl. No. 10/825,587, Office Action dated Jun. 25, 2007.
U.S. Appl. No. 10/825,587, Office Action dated Apr. 1, 2008.
U.S. Appl. No. 10/825,587, Office Action dated Jun. 5, 2008.
U.S. Appl. No. 10/825,587, Office Action dated Oct. 16, 2008.
U.S. Appl. No. 10/772,228, Office Action dated Sep. 21, 2007.
U.S. Appl. No. 10/772,228, Office Action dated Nov. 28, 2006.
U.S. Appl. No. 10/824,944, Office Action dated Mar. 12, 2007.
U.S. Appl. No. 10/824,944, Office Action dated Sep. 7, 2006.
U.S. Appl. No. 11/245,472, Office Action dated Apr. 16, 2008.
U.S. Appl. No. 10/986,441, Office Action dated Oct. 20, 2008.
U.S. Appl. No. 11/823,847, Office Action dated Sep. 16, 2008.
U.S. Appl. No. 12/649,245, Office Action dated Mar. 31, 2010.
U.S. Appl. No. 10/825,587, Notice of Allowance dated Nov. 24, 2008.
U.S. Appl. No. 10/772,228, Notice of Allowance dated Jan. 22, 2008.
U.S. Appl. No. 11/824,574, Office Action dated Dec. 31, 2008.
China patent application No. 2003801061464, First Office Action dated Oct. 27, 2006.
Nippon Telegr & Teleph Corp., "Patent Abstracts of Japan," vol. 008, No. 119 (E-248), Jun. 5, 1984 & JP 59 031573 A, Feb. 20, 1984.
Anders et al., "Plasma is Produced Simply", R&D Research & Development, R&D Magazine, vol. 39, No. 10, Sep. 1997, www.rdmag.com, p. 65.
Steven D. Jones, et al., "Thin film rechargeable Li batteries", 1994, Solid State Ionics.
J.B. Bates, et al., "Thin-film rechargeable lithium batteries," 1995, Journal of Power Sources.
N. J. Dudney, et al., "Sputtering of lithium compounds for preparation of electrolyte thin films," 1992, Solid State Ionics.
J. B. Bates, et al., "Electrical properties of amorphous lithium electrolyte thin films," 1992, Solid State Ionics.
Xiaohua Yu, et al, "A Stable Thin-Film Lithium Electrolyte: Lithium Phosphorus Oxynitride," Feb. 1997, J. Electrochem. Soc., vol. 144, No. 2.
Fu, Jie, "Fast Li+ Ion Conduction in $Li_2O$—$Al_2O_3$—$TiO_2$—$SiO_2$—$P_2O_5$ Glass-Ceramics", Journal of the American Ceramics Society, vol. 80, No. 7, Jul. 1997, pp. 1-5.

(56) References Cited

OTHER PUBLICATIONS

Aono et al., "Ionic Coductivity of the Lithium Titanium Phosphate ($Li_{1+X}M_XTi_{2-X}(PO_4)_3$, M=Al, Sc, Y, and La) Systems", Dept. of Industrial Chemistry, pp. 590-591, Aug. 19, 1988.

Aono, Hiromichi, "High Li+ Conducting Ceramics", Acc. Chem. Res. vol. 27, No. 9, 1994, pp. 265-270.

Aono, et al., "Ionic Conductivity and Sinterability of Lithium Titanium Phosphate System", Solid State Ionics, 40/41 (1990), pp. 38-42.

Aono, et al., "Electrical properties and crystal structure of solid electrolyte based on lithium hafnium phosphate $LiHf_2(PO_4)_3$", Solid State Ionics 62 (1993), pp. 309-316.

Aorto, et al., "Electrical property and sinterability of $LiTi_2(PO_4)_3$ mixed with lithium salt ($Li_3PO_4$ or $Li_3BO_3$)", Solid State Ionics 47 (1991) pp. 257-264.

Aono, et al., "Ionic Conductivity of $.beta.=Fe_2(SO_4)_3$ Type $Li_3Cr_2(PO_4)_3$ Based Electrolyte", Chemistry Letters, 1993, pp. 2033-2036.

Aono, et al., "Ionic Conductivity of $LiTi_2(PO_4)_3$ Mixed with Lithium Salts", Chemistry Letters, 1990, pp. 331-334.

Fu, Jie, "Superionic conductivity of glass-ceramics in the system $Li_2O-Al_2O_3-TiO_3-P_2O_5$", Solid State Ionics, 96 (1997), pp. 195-200.

Fu, Jie, "Fast Li+ ion conducting glass-ceramics in the system $Li_2O-Al_2O_3-GeO_2-P_2O_5$" Solid State Ionics 104 (1997), pp. 191-194.

Aono, et al., "DC Conductivity of $Li_{1.3}Al_{0.3}Ti_{1.7}(PO_4)_3$ Ceramic with Li Electrodes", Chemistry Letters, 1991, pp. 1567-1570.

Aono, et al., "Electrical Properties of Sintered Lithium Titanium Phosphate Ceramics ($Li_{1+X}M_XTi_{2-X}PO_4)_3$, $M^{3+}=Al^{3+}, Sc^{3+}$, or $Y^{3+}$)", Chemistry Letters, 1990, pp. 1825-1828.

Button, et al., "Structural disorder and enhanced ion transport in amorphous conductors", Solid State Ionics, vols. 9-10, Part 1, Dec. 1983, pp. 585-592 (abstract).

Shuster, Nicholas, "Lithium Water Power Source for Low Power—Long Duration Undersea Applications", Westinghouse Electric Corporation, 1990 IEEE, pp. 118-123.

VanVoorhis, et al., "Evaluation of Air Cathodes for Lithium/Air Batteries", Electrochemical Society Proceedings vol. 98-16, 1999, pp. 383-390.

Blurton et al., "Metal/Air Batteries: Their Status and Potential—A Review", Journal of Power Sources, 4, (1979), pp. 263-279.

J. Read, "Characterization of the Lithium/Oxygen Organic Electrolyte Battery", Journal of the Electrochemical Society, 149 (9) (2002), pp. A1190-A1195.

Abraham et al., "A Polymer Electrolyte-Based Rechargeable Lithium/Oxygen Battery", Technical Papers, Electrochetnical Science and Technology, J. Electrochetn. Soc., vol. 143, No. 1, Jan. 1996, pp. 1-5.

Kessler, et al., "Large Microsheet Glass for 40-in. Class PALC Displays". 1997, FMC2-3, pp. 61-63.

Feng et al., "Electrochemical behavior of intermetallic-based metal hydrides used in Ni/metal hydride (MH) batteries: a review", International Journal of Hydrogen Energy, 26 (2001), pp. 725-734.

Iwakura et al., "All solid-state nickel/metal hydride battery with a proton-conductive phosphoric acid-doped silica gel electrolyte", Electrochimica Acta 48 (2003), pp. 1499-1503.

Li et al., "Lithium-Ion Cells with Aqueous Electrolytes", J. Electrochcm. Soc., vol. 142, No. 6, Jun. 1995, pp. 1742-1746.

Zhang et al., "Electrochemical Lithium Intercalation in $VO_2(B)$ in Aqueous Electrolytes", J. Electrochem. Soc., vol. 143, No. 9, Sep. 1996, pp. 2730-2735.

Urquidi-Mcdonald, Mirna, "Hydroen storage and semi-fuel cells", http://engr.psu.edu/h2e/Pub/Macdonald1.htm, (downloaded Jan. 27, 2004, 3 pages).

Urquidi-Mcdonald, et al., "Lithium/poly(organophosphazene) membrane anodes in KOH and seawater", Electrochimica Acta 47, (2002), pp. 2495-2503.

Nimon et al., "Stability of Lithium Electrode in Contact with Glass Electrolytes", SSI-14, Jun. 22-27, 2003, Monterey, CA. (conference poster).

Nimon et al., "Stability of Lithium Electrode in Contact with Glass Electrolytes", SSI-14 Conference, Monterey, CA, Jun. 22, 2003, Abstract of Poster.

Inaguma et al., "High Ionic Conductivity in Lithium Lanthanum Titanate", Solid State Communications, vol. 86, No. 10, pp. 689-693, 1993.

Kobayashi et al., "All-solid-state lithium secondary battery with ceramic-polymer composite electrolyte", Solid State Ionics 152-153 (2002) 137-142.

Will et al., "Primary Sodium Batteries with Beta-Alumina Solid Electrolyte", J. Electrochemical Science and Technology, Apr. 1975, vol. 122, No. 4, pp. 457-461.

EP patent application No. 03809186.4, Examination Report dated Mar. 21, 2006.

International patent application No. PCT/US2004/033371, International Search Report dated Mar. 6, 2006.

International patent application No. PCT/US2004/033424, International Search Report dated Jan. 6, 2006.

Galbraith, A.D., "The lithium-water-air battery for automotive propulsion", XP002355800, retrieved from STN Database accession No. 1979:106901 abstract and Symp. Int. Veh. Electr., RAPP, 4.sup.th vol. 1, paper 32.4, 23 pp., Publisher: Electr. Veh. Counc., New York, N.Y. Conden: 39UPAD, 1976.

International patent application No. PCT/US2004/033361, International Search Report and Written Opinion dated Jan. 16, 2006.

International patent application No. PCT/US2004/033424, International Search Report and Written Opinion dated Mar. 6, 2006.

West, et al., "Chemical stability enhancement of lithium conducting solid electrolyte plates using sputtered LiPON thin films", Journal of Power Sources, vol. 126, Issues 1-2, pp. 1-272 (Feb. 16, 2004).

International patent application No. PCT/US2004/033424, Invitation to Pay Additional Fees dated Jan. 6, 2006.

EP patent application No. 04794699.1, Examination Report dated May 31, 2007.

WO patent application No. PCT/US06/45407, International Search Report and Written Opinion, dated Aug. 30, 2007.

CN patent application No. 200480037293.5, Office Action dated Aug. 22, 2008.

EP patent application No. 04794699.1, Examination Report dated Aug. 5, 2008.

AU patent application No. 2003301383, Examination Report dated Sep. 29, 2008.

CN patent application No. 200480042697.3, Office Action dated Feb. 15, 2008.

U.S. Appl. No. 11/245,472, Office Action dated Jul. 24, 2008.

CN patent application No. 200480042697.3, Office Action dated Dec. 19, 2008.

Thokchom, Joukumar S., et al., Water Durable Lithium Ion Conducting Composite Membrane from the $Li_2O-Al_2O_3-TiO_2-P_2O_5$ Glass-Ceramic, Journal of the Electrochemical Society, 154 (4), 2007, pp. A331-A336.

U.S. Appl. No. 11/245,472, Office Action dated Jan. 8, 2009.

U.S. Appl. No. 1/824,579, OfficeAction dated Jan. 29, 2009.

U.S. Appl. No. 11/823,847, Office Action dated Apr. 28, 2009.

CN patent application No. 200480042697.3, Office Action dated Jun. 5, 2009.

U.S. Appl. No. 11/245,472, Office Action dated Jul. 8, 2009.

AU patent application No. 2004306866, Exam Report dated Apr. 9, 2009.

AU patent application No. 2004316638, Office Action dated Aug. 3, 2009.

U.S. Appl. No. 10/986,441, Notice of Allowance dated Jun. 19, 2009.

U.S. Appl. No. 10/772,157, Notice of Allowance dated Sep. 17, 2009.

International patent application No. PCT/US06/48755, International Search Report dated Apr. 7, 2008.

(56) References Cited

OTHER PUBLICATIONS

International patent application No. PCT/US06/48755, Written Opinion dated Apr. 7, 2008.
Ogasawara T. et al., "Rechargeable Li$_2$O$_2$ Electrode for Lithium Batteries", J. Am. Chem. Soc. 128(4), 2006, pp. 1390-1393.
Foster D.L. et al., "Ceramic Membranes for Lithium Batteries", Proceeding of the 42$^{nd}$ Power Sources Conference, Jun. 2006, p. 2.14.
Read J., "Electrolyte Formulation and Temperature Performance of the Li/O$_2$ Battery", Proceeding of the 9$^{th}$ Electrochemical Power Sources R&D Symposium, Jun. 2005, 15 pages.
EP patent application No. 04794699.1, Notice of Allowance dated Jun. 10, 2009.
U.S. Appl. No. 12/334,116, Office Action dated Oct. 27, 2009.
EP patent application No. 03809186.4, Exan nation Report dated Nov. 24, 2009.
U.S. Appl. No. 11/824,548 Notice of Allowance dated Dec. 17, 2009.
U.S. Appl. No. 11/245,472, Office Action dated Feb. 4, 2010.
U.S. Appl. No. 12/475,403, Office Action dated Feb. 8, 2010.
AU patent application No. 2003301383, Notice of Acceptance dated Nov. 26, 2009.
CN patent application No. 200480037293.5, Office Action dated Jan. 29, 2010.
EP patent application No. 04794655.3, Examination Report dated Apr. 22, 2010.
CA patent application No. 2,502,438, Examination Report dated May 12, 2010.
U.S. Appl. No. 11/562,883, Office Action dated Jun. 7, 2010.
AU patent application No. 20 6280097, Examination Report dated Jun. 9. 2010.
JP patent application No. 2004-545584, Notification of reason for rejection dated Jun. 8, 2010.
U.S. Appl. No. 12/475,403, Office Action dated Jun. 22, 2010.
U.S. Appl. No. 11/824,579, Office Action dated Jun. 25, 2010.
CN patent application No. 200480037293.5, Office Action dated Jun. 24, 2010.
AU patent application No. 2004306866, Notice of Acceptance dated Jun. 17, 2010.
U.S. Appl. No. 12/831,066, "Active Metal Fuel Cells", Visco et al., filed Jul. 6, 2010.
U.S. Appl. No. 12/649,245, Office Action dated Jul. 19, 2010.
U.S. Appl. No. 12/831,066, Office Action dated Aug. 18, 2010.
U.S. Appl. No. 11/824,597, Notice of Allowance dated Sep. 9, 2010.
KR patent application No. 10-2005-7006382, Office Action dated Aug. 31, 2010.
U.S. Appl. No. 12/475,403, Notice of Allowance dated Oct. 7, 2010.
U.S. Appl. No. 12/907,819, "In situ formed ionically conductive membranes for protection of active metal anodes and battery cells", Visco et al., filed Oct. 19, 2010.
Thangadurai, Venkataraman et al., "Novel fast lithium ion conduction in garnet-type Li$_5$La$_3$M$_2$O$_{12}$ (M=Nb, Ta)", J. Am. Chem. Soc. 86 (3) 437-40 (2003), Oct. 21, 2002.
U.S. Appl. No. 12/649,245, Office Action dated Nov. 30, 2010.
U.S. Appl. No. 11/612,741, Office Action dated Nov. 29, 2010.
U.S. Appl. No. 11/562,883, Office Action dated Jan. 19, 2011.
U.S. Appl. No. 12/831,066, Office Action dated Jan. 19, 2011.
CA patent application No. 2,542,304, Examination Report dated Apr. 4, 2011.
U.S. Appl. No. 12/831,066, Notice of Allowance dated Apr. 6, 2011.
U.S. Appl. No. 12/907,819, Office Action dated May 12, 2011.
Visco, S.J. et al., "Lithium-Air", Encyclopedia of Electrochemical Power Sources, Dyer (editor), Elsevier, 2009, ISBN: 9780444527455, pp. 376-383.
CA patent application No. 2,555,637, Exam Report dated May 10, 2011.
KR patent application No. 10-2006-7017692, Notice to Submit Response dated May 13, 2011.
JP patent application No. 2006-535572, Office Action dated Jun. 21, 2011.
JP patent application No. 2006-552102, Office Action dated Jul. 5, 2011.
U.S. Appl. No. 11/612,741, Office Action dated Jul. 22, 2011.
U.S. Appl. No. 12/649,245, Notice of Allowance dated Sep. 14, 2011.
KR patent application No. 2006-7007309, Office Action dated Jul. 27, 2011.
KR patent application No. 2005-7006382, Office Action dated Aug. 10, 2011.
U.S. Appl. No. 12/907,819, Notice of Allowance dated Nov. 10, 2011.
U.S. Appl. No. 13/236,428, Office Action dated Nov. 16, 2011.
U.S. Appl. No. 13/336,459, "Solid State Battery", Visco et al., filed Dec. 23, 2011.
CN patent application No. 200910174018.7, Office Action dated Oct. 19, 2011.
U.S. Appl. No. 11/612,741, Notice of Allowance dated Feb. 3, 2012.
U.S. Appl. No. 11/612,741, Allowed Claims, Feb. 3, 2012.
CA patent application No. 2,542,304, Exam Report dated Apr. 3, 2012.
KR patent application No. 9-5-2012-016417008, Office Action dated Mar. 21, 2012.
U.S. Appl. No. 13/236,428, Notice of Allowance dated Apr. 25, 2012.
U.S. Appl. No. 13/236,428, Allowed Claims, Apr. 25, 2012.
U.S. Appl. No. 12/888,154, Office Action dated May 3, 2012.
KR patent application No. 10-2005-7006382, Office Action dated Mar. 31, 2012.
U.S. Appl. No. 13/464,835, "Protected lithium electrodes having tape cast ceramic and glass-ceramic membranes," Visco et al., filed May 4, 2012.
U.S. Appl. No. 13/336,459, Office Action dated Jun. 7, 2012.
U.S. Appl. No. 13/453,964, "Substantially impervious lithium super ion conducting membranes," Visco et al., filed Apr. 23, 2012.
U.S. Appl. No. 13/182,322, Office Action dated Jul. 5, 2012.
EP patent application No. 03809186.4, Exam Report dated Jun. 21, 2012.
U.S. Appl. No. 13/453,964, Notice of Allowance dated Aug. 14, 2012.
U.S. Appl. No. 12/888,154, Notice of Allowance dated Aug. 20, 2012.
U.S. Appl. No. 13/464,835, Office Action dated Sep. 25, 2012.
U.S. Appl. No. 13/182,322, Notice of Allowance dated Sep. 19, 2012.
JP patent application No. 2006-552102, Office Action dated Sep. 25, 2012.
KR patent application No. 10-2005-7006382, Notice to Submit Response dated Oct. 30, 2012.
KR patent application No. 9-5-2012-016417008, Notice of Allowance dated Nov. 23, 2012.
U.S. Appl. No. 13/717,255, "Active Metal Fuel Cells," Visco et al., filed Dec. 17, 2012.
Licht et al., "A solid sulfur cathode for aqueous batteries," Science, vol. 261, No. 5124 (Aug. 20, 1993) 1029-1032.
Licht et al., "Investigation of a novel aqueous aluminum/sulfur buttery," Journal of Power Sources, 45 (1993) 311-323.
U.S. Appl. No. 13/673,789, Office Action dated Feb. 28, 2013.
U.S. Appl. No. 13/615,351, Office Action dated Mar. 25, 2013.
CA patent application No. 2,542,304, Office Action dated Jan. 30, 2013.
U.S. Appl. No. 13/464,835, Office Action dated May 2, 2013.
U.S. Appl. No. 13/615,351, Notice of Allowance dated May 1, 2013.
U.S. Appl. No. 11/562,883, Office Action dated Jun. 10, 2013.
U.S. Appl. No. 13/708,540, Office Action dated Jun. 17, 2013.
U.S. Appl. No. 13/464,835, Office Action dated Aug. 29, 2013.
Choi et al., "Challenges facing lithium batteries and electrical double-layer capacitors," www.angewandte.org Angew. Chem. Int. Ed. 2012, 51, 9994-10024 (31 pages).
Freunberger et al., "Reactions in the rechargeable lithium-O$_2$ battery with alkyl carbonate electrolytes," ACS Publications, J. Am. Chem. Soc. 2011, 133, 8040-8047 (8 pages).

(56) References Cited

OTHER PUBLICATIONS

Freunberger et al., "The lithium-oxygen battery with ether-based electrolytes," Wiley Online Library, Angew. Chem. Int. Ed. 2011, 50, 1-6 (6 pages).
CA patent application No. 2,542,304, Notice of Allowance dated Aug. 18, 2013.
TW patent application No. 097122683, Office Action dated Aug. 13, 2013.
U.S. Appl. No. 13/673,789, Notice of Allowance dated Oct. 1, 2013.
U.S. Appl. No. 13/708,540, Office Action dated Oct. 16, 2013.
U.S. Appl. No. 11/562,883, Notice of Allowance dated Oct. 17, 2013.
JP patent application No. 2006-552102, Office Action dated Nov. 26, 2013.
U.S. Appl. No. 13/464,835, Office Action dated Jan. 16, 2014.
Linden and T.B. Reddy, Handbook of Batteries, McGraw-Hill, NY 3.sup.rd Edition, 2002, p. 38.5.
U.S. Appl. No. 13/717,255, Notice of Allowance dated Jan. 30, 2014.
U.S. Appl. No. 12/484,063, Office Action dated Feb. 6, 2012.
U.S. Appl. No. 12/484,081, Office Action dated Jun. 21, 2012.
U.S. Appl. No. 12/484,063, Office Action dated Aug. 1, 2012.
U.S. Appl. No. 12/484,065, Office Action dated Aug. 9, 2012.
U.S. Appl. No. 12/484,063, Notice of Allowance dated Sep. 14, 2012.
U.S. Appl. No. 12/484,081, Notice of Allowance dated Jan. 18, 2013.
U.S. Appl. No. 12/484,065, Office Action dated Feb. 19, 2013.
CN patent application No. 200980131906.4, First Office Action dated Dec. 4, 2012.
MX patent application No. 2010/013888, First Official Action dated Jan. 25, 2013.
U.S. Appl. No. 12/484,079, Office Action dated Nov. 29, 2012.
WO patent application No. PCT/US2011/030969, International Search Report and Written Opinion dated Jan. 11, 2012.
U.S. Appl. No. 12/484,079, Notice of Allowance dated Apr. 17, 2013.
U.S. Appl. No. 12/484,065, Office Action dated Jun. 17, 2013.
EP patent application No. 09794889, Supplemental Search Report dated May 21, 2013.
U.S. Appl. No. 12/484,065, Notice of Allowance dated Oct. 4, 2013.
MX patent application No. 2010/013888, Office Action dated Jul. 22, 2013.
CN patent application No. 200980131906.4, Office Action dated Jun. 26, 2013.
JP patent application No. 2011-513742, Office Action dated Oct. 8, 2013.
U.S. Appl. No. 13/663,224, Notice of Allowance dated Oct. 11, 2013.
U.S. Appl. No. 13/938,029, "Electrochemical device with protective membrane architecture," Visco et al., filed Jul. 9, 2013.
KR patent application No. 2013-078956319, Notice to Submit Response dated Nov. 18, 2013.
JP patent application No. 2011-513742, Notification of Reasons for Rejection dated Feb. 4, 2014.
WO2009/003695, machine English translation, Jan. 8, 2009.
WO2013/010692, machine English translation, Jan. 24, 2013.
MX patent application No. 2010/013888. Office Action dated Feb. 20, 2014.
U.S. Appl. No. 13/708,540, Office Action dated Apr. 17, 2014.
EP patent application No. 09794889.7, Office Action dated Apr. 10, 2014.
U.S. Appl. No. 14/156,267, Notice of Allowance dated Mar. 9, 2016.
U.S. Appl. No. 15/150,231, Office Action dated Sep. 1, 2016.
U.S. Appl. No. 15/150,231, Office Action dated Feb. 13, 2017.
U.S. Appl. No. 14/289,502, Final Office Action dated Feb. 17, 2017.
U.S. Appl. No. 15/150,231, Notice of Allowance dated Mar. 29, 2017.
U.S. Appl. No. 14/809,083, Notice of Allowance dated May 25, 2017, 7 pages.
U.S. Appl. No. 15/423,458, filed Feb. 2, 2017, Steven J. Visco et al.
U.S. Appl. No. 15/423,458, Non-Final Office Action dated May 31, 2017.

SAFETY ENHANCED LI-ION AND LITHIUM METAL BATTERY CELLS HAVING PROTECTED LITHIUM ELECTRODES WITH ENHANCED SEPARATOR SAFETY AGAINST DENDRITE SHORTING

CROSS-REFERENCE TO RELATED APPLICATIONS

This application is a continuation of U.S. patent application Ser. No. 15/150,231, filed May 9, 2016, now allowed, which is a continuation of U.S. patent application Ser. No. 14/156,267, filed Jan. 15, 2014, now issued as U.S. Pat. No. 9,368,775 on Jun. 14, 2016, which claims priority to U.S. Provisional Patent Application No. 61/763,412 filed Feb. 11, 2003, titled PROTECTED LITHIUM ELECTRODES HAVING A POROUS ELECTROLYTE INTERLAYER AND BATTERY CELLS THEREOF; and is a continuation-in-part of U.S. patent application Ser. No. 13/929,653, filed Jun. 27, 2013, titled LITHIUM BATTERY HAVING A PROTECTED LITHIUM ELECTRODE AND AN IONIC LIQUID CATHOLYTE, now U.S. Pat. No. 8,828,580; which is a continuation of U.S. patent application Ser. No. 13/615,351, filed Sep. 13, 2012, titled PROTECTED LITHIUM ELECTRODES HAVING A POLYMER ELECTROLYTE INTERLAYER AND BATTERY CELLS THEREOF, now U.S. Pat. No. 8,501,339; which is a continuation of U.S. patent application Ser. No. 12/888,154, filed Sep. 22, 2010, titled PROTECTED ACTIVE METAL ELECTRODE AND BATTERY CELL WITH IONICALLY CONDUCTIVE PROTECTIVE ARCHITECTURE, now U.S. Pat. No. 8,293,398; which is a continuation of U.S. patent application Ser. No. 11/824,597, filed Jun. 28, 2007, titled PROTECTED ACTIVE METAL ELECTRODE AND BATTERY CELL STRUCTURES WITH NON-AQUEOUS INTERLAYER ARCHITECTURE, now U.S. Pat. No. 7,829,212; which is a divisional of U.S. patent application Ser. No. 10/824,944, filed Apr. 14, 2004, titled PROTECTED ACTIVE METAL ELECTRODE AND BATTERY CELL STRUCTURES WITH NON-AQUEOUS INTERLAYER ARCHITECTURE, now U.S. Pat. No. 7,282,295; which in turn claims priority to U.S. Provisional Patent Application No. 60/542,532 filed Feb. 6, 2004, titled PROTECTED ACTIVE METAL ELECTRODE AND BATTERY CELL STRUCTURES WITH NON-AQUEOUS INTERLAYER ARCHITECTURE; and U.S. Provisional Patent Application No. 60/548,231 filed Feb. 27, 2004, titled VARIATIONS ON PROTECTED ACTIVE METAL ELECTRODE AND BATTERY CELL STRUCTURES WITH NON-AQUEOUS INTERLAYER ARCHITECTURE.

Application Ser. No. 14/156,267 also claims the benefit of U.S. Provisional Patent Application No. 61/763,412 filed Feb. 11, 2013, titled PROTECTED LITHIUM ELECTRODES HAVING A POROUS ELECTROLYTE INTERLAYER AND BATTERY CELLS THEREOF.

The disclosures of all these prior applications are incorporated herein by reference in their entirety and for all purposes.

STATEMENT OF GOVERNMENT SUPPORT

This invention was made with Government support under Award No.: DE-AR0000349 awarded by the Advanced Research Projects Agency-Energy (ARPA-E), U.S. Department of Energy. The Government has certain rights in this invention.

BACKGROUND OF THE INVENTION

1. Field of the Invention

The present invention relates generally to active metal electrochemical devices. More particularly, this invention relates to an active metal (e.g., alkali metals, such as lithium), active metal intercalation (e.g. lithium-carbon, carbon) and active metal alloys (e.g., lithium-tin) alloys or alloying metals (e.g., tin) electrochemical (e.g., electrode) structures and battery cells. The electrode structures have ionically conductive protective architecture including an active metal (e.g., lithium) conductive impervious layer separated from the electrode (anode) by a porous separator impregnated with a non-aqueous electrolyte. This protective architecture prevents the active metal from deleterious reaction with the environment on the other (cathode) side of the impervious layer, which may include aqueous, air or organic liquid electrolytes and/or electrochemically active materials.

2. Description of Related Art

The low equivalent weight of alkali metals, such as lithium, render them particularly attractive as a battery electrode component. Lithium provides greater energy per volume than the traditional battery standards, nickel and cadmium. Unfortunately, no rechargeable lithium metal batteries have yet succeeded in the market place.

The failure of rechargeable lithium metal batteries is largely due to cell cycling problems. On repeated charge and discharge cycles, lithium "dendrites" gradually grow out from the lithium metal electrode, through the electrolyte, and ultimately contact the positive electrode. This causes an internal short circuit in the battery, rendering the battery unusable after a relatively few cycles. While cycling, lithium electrodes may also grow "mossy" deposits that can dislodge from the negative electrode and thereby reduce the battery's capacity.

To address lithium's poor cycling behavior in liquid electrolyte systems, some researchers have proposed coating the electrolyte facing side of the lithium negative electrode with a "protective layer." Such protective layer must conduct lithium ions, but at the same time prevent contact between the lithium electrode surface and the bulk electrolyte. Many techniques for applying protective layers have not succeeded.

Some contemplated lithium metal protective layers are formed in situ by reaction between lithium metal and compounds in the cell's electrolyte that contact the lithium. Most of these in situ films are grown by a controlled chemical reaction after the battery is assembled. Generally, such films have a porous morphology allowing some electrolyte to penetrate to the bare lithium metal surface. Thus, they fail to adequately protect the lithium electrode.

Various pre-formed lithium protective layers have been contemplated. For example, U.S. Pat. No. 5,314,765 (issued to Bates on May 24, 1994) describes an ex situ technique for fabricating a lithium electrode containing a thin layer of sputtered lithium phosphorus oxynitride ("LiPON") or related material. LiPON is a glassy single ion conductor (conducts lithium ion) that has been studied as a potential electrolyte for solid state lithium microbatteries that are fabricated on silicon and used to power integrated circuits (See U.S. Pat. Nos. 5,597,660, 5,567,210, 5,338,625, and 5,512,147, all issued to Bates et al.).

Work in the present applicants' laboratories has developed technology for the use of glassy or amorphous protective layers, such as LiPON, in active metal battery electrodes. (See, for example, U.S. Pat. No. 6,025,094, issued Feb. 15, 2000, U.S. Pat. No. 6,402,795, issued Jun. 11, 2002, U.S. Pat. No. 6,214,061, issued Apr. 10, 2001 and U.S. Pat. No. 6,413,284, issued Jul. 2, 2002, all assigned to PolyPlus Battery Company).

Prior attempts to use lithium anodes in aqueous environments relied either on the use of very basic conditions such as use of concentrated aqueous KOH to slow down the corrosion of the Li electrode, or on the use of polymeric coatings on the Li electrode to impede the diffusion of water to the Li electrode surface. In all cases however, there was substantial reaction of the alkali metal electrode with water. In this regard, the prior art teaches that the use of aqueous cathodes or electrolytes with Li-metal anodes is not possible since the breakdown voltage for water is about 1.2 V and a Li/water cell can have a voltage of about 3.0 V. Direct contact between lithium metal and aqueous solutions results in violent parasitic chemical reaction and corrosion of the lithium electrode for no useful purpose. Thus, the focus of research in the lithium metal battery field has been squarely on the development of effective non-aqueous (mostly organic) electrolyte systems.

SUMMARY OF THE INVENTION

The present invention relates generally to active metal electrochemical devices. More particularly, this invention relates to an active metal (e.g., alkali metals, such as lithium), active metal intercalation (e.g. lithium-carbon, carbon) and active metal alloys (e.g., lithium-tin, lithium-silicon) alloys or alloying metals (e.g., tin, silicon) electrochemical (e.g., electrode) structures and battery cells. The electrochemical structures have ionically conductive protective architecture including an active metal (e.g., lithium) ion conductive substantially impervious layer separated from the electrode (anode) by a porous separator impregnated with a non-aqueous electrolyte (anolyte). This protective architecture prevents the active metal from deleterious reaction with the environment on the other (cathode) side of the impervious layer, which may include aqueous, air or organic liquid electrolytes (catholytes) and/or electrochemically active materials.

The separator layer of the protective architecture prevents deleterious reaction between the active metal (e.g., lithium) of the anode and the active metal ion conductive substantially impervious layer. Thus, the architecture effectively isolates (de-couples) the anode/anolyte from solvent, electrolyte processing and/or cathode environments, including such environments that are normally highly corrosive to Li or other active metals, and at the same time allows ion transport in and out of these potentially corrosive environments.

Various embodiments of the cells and cell structures of the present invention include active metal, active metal-ion, active metal alloying metal, and active metal intercalating anode materials protected with an ionically conductive protective architecture having a non-aqueous anolyte. These anodes may be combined in battery cells with a variety of possible cathode systems, including water, air, metal hydride and metal oxide cathodes and associated catholyte systems, in particular aqueous catholyte systems.

Safety additives may also be incorporated into the structures and cells of the present invention for the case where the substantially impervious layer of the protective architecture (e.g., a glass or glass-ceramic membrane) cracks or otherwise breaks down and allows the aggressive catholyte to enter and approach the lithium electrode. The non-aqueous interlayer architecture can incorporate a gelling/polymerizing agent that, when in contact with the reactive catholyte, leads to the formation of an impervious polymer on the lithium surface. For example, the anolyte may include a monomer for a polymer that is insoluble or minimally soluble in water, for example dioxolane (Diox)/polydioxaloane and the catholyte may include a polymerization initiator for the monomer, for example, a protonic acid.

In addition, the structures and cells of the present invention may take any suitable form. One advantageous form that facilitates fabrication is a tubular form.

In one aspect, the invention pertains to an electrochemical cell structure. The structure includes an anode composed of an active metal, active metal-ion, active metal alloy, active metal alloying metal or active metal intercalating material. The anode has an ionically conductive protective architecture on its surface. The architecture includes an active metal ion conducting separator layer that has a non-aqueous anolyte and is chemically compatible with the active metal and in contact with the anode, and a substantially impervious ionically conductive layer chemically compatible with the separator layer and aqueous environments and in contact with the separator layer. The separator layer may be, a semi-permeable membrane impregnated with an organic anolyte, for example, a micro-porous polymer impregnated with a liquid or gel phase anolyte. Such an electrochemical (electrode) structure may be paired with a cathode system, including an aqueous cathode system, to form battery cells in accordance with the present invention.

The structures and battery cells incorporating the structures of the present invention may have various configurations and compositions, including prismatic and cylindrical, and compositions, including active metal ion, alloy and intercalation anodes, aqueous, water, air, metal hydride and metal oxide cathodes, and aqueous, organic or ionic liquid catholytes; electrolyte (anolyte and/or catholyte) compositions to enhance the safety and/or performance of the cells; and fabrication techniques.

These and other features of the invention are further described and exemplified in the detailed description below.

DETAILED DESCRIPTION OF SPECIFIC EMBODIMENTS

Figure 1:
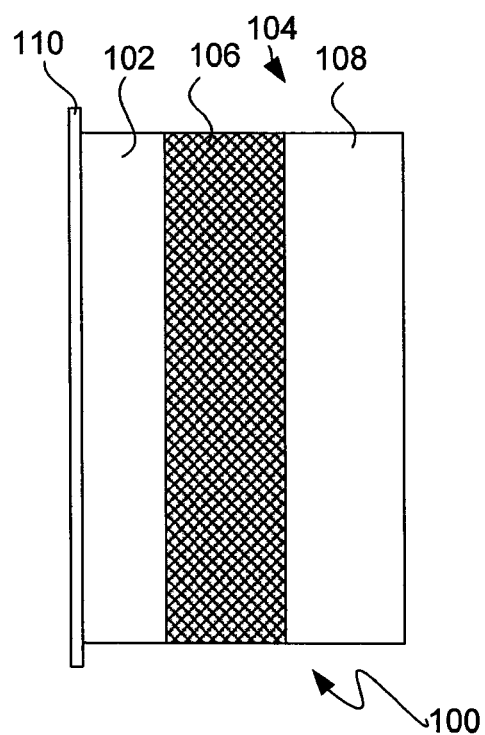
FIG. 1 is a schematic illustration of an electrochemical structure cell incorporating an ionically conductive protective interlayer architecture in accordance with the present invention.

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail so as to not unnecessarily obscure the present invention.

When used in combination with "comprising," "a method comprising," "a device comprising" or similar language in this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

INTRODUCTION

Active metals are highly reactive in ambient conditions and can benefit from a barrier layer when used as electrodes. They are generally alkali metals such (e.g., lithium, sodium or potassium), alkaline earth metals (e.g., calcium or magnesium), and/or certain transitional metals (e.g., zinc), and/or alloys of two or more of these. The following active metals may be used: alkali metals (e.g., Li, Na, K), alkaline earth metals (e.g., Ca, Mg, Ba), or binary or ternary alkali metal alloys with Ca, Mg, Sn, Ag, Zn, Bi, Al, Cd, Ga, In. Preferred alloys include lithium aluminum alloys, lithium silicon alloys, lithium tin alloys, lithium silver alloys, and sodium lead alloys (e.g., $Na_4Pb$). A preferred active metal electrode is composed of lithium.

The low equivalent weight of alkali metals, such as lithium, render them particularly attractive as a battery electrode component. Lithium provides greater energy per volume than the traditional battery standards, nickel and cadmium. However, lithium metal or compounds incorporating lithium with a potential near that (e.g., within about a volt) of lithium metal, such as lithium alloy and lithium-ion (lithium intercalation) anode materials, are highly reactive to many potentially attractive electrolyte and cathode materials. This invention describes the use of a non-aqueous electrolyte interlayer architecture to isolate an active metal (e.g., alkali metal, such as lithium), active metal alloy or active metal-ion electrode (usually the anode of a battery cell) from ambient and/or the cathode side of the cell. The architecture includes an active metal ion conducting separator layer with a non-aqueous anolyte (i.e., electrolyte about the anode), the separator layer being chemically compatible with the active metal and in contact with the anode, and a substantially impervious ionically conductive layer chemically compatible with the separator layer and aqueous environments and in contact with the separator layer. The non-aqueous electrolyte interlayer architecture effectively isolates (de-couples) the anode from ambient and/or cathode, including catholyte (i.e., electrolyte about the cathode) environments, including such environments that are normally highly corrosive to Li or other active metals, and at the same time allows ion transport in and out of these potentially corrosive environments. In this way, a great degree of flexibility is permitted the other components of an electrochemical device, such as a battery cell, made with the architecture. Isolation of the anode from other components of a battery cell or other electrochemical cell in this way allows the use of virtually any solvent, electrolyte and/or cathode material in conjunction with the anode. Also, optimization of electrolytes or cathode-side solvent systems may be done without impacting anode stability or performance.

There are a variety of applications that could benefit from the use of aqueous solutions, including water and water-based electrolytes, air, and other materials reactive to lithium and other active metals, including organic solvents/electrolytes and ionic liquids, on the cathode side of the cell with an active (e.g., alkali, e.g., lithium) metal or active metal intercalation (e.g., lithium alloy or lithium-ion) anode in a battery cell.

The use of lithium intercalation electrode materials like lithium-carbon and lithium alloy anodes (e.g., those based on Sn and Si), and combinations thereof, rather than lithium metal, for the anode can also provide beneficial battery characteristics. First of all, it allows the achievement of prolonged cycle life of the battery without risk of formation of lithium metal dendrites that can grow from the Li surface to the membrane surface causing the membrane's deterioration. Also, the use of lithium-carbon and lithium alloy anodes in some embodiments of the present invention instead of lithium metal anode can significantly improve a battery's safety because it avoids formation of highly reactive "mossy" lithium during cycling.

The present invention describes a protected active metal, alloy or intercalation electrode that enables very high energy density lithium batteries such as those using aqueous electrolytes or other electrolytes that would otherwise adversely react with lithium metal, for example. Examples of such high energy battery couples are lithium-air, lithium-water lithium-metal hydride, lithium-metal oxide, and the lithium alloy and lithium-ion variants of these. The cells of the invention may incorporate additional components in their electrolytes (anolytes and catholytes) to enhance cell safety, and may have a variety of configurations, including planar and tubular/cylindrical.

Non-Aqueous Interlayer Architecture

The non-aqueous interlayer architecture of the present invention is provided in an electrochemical cell structure, the structure having an anode composed of a material selected from the group consisting of active metal, active metal-ion, active metal alloy, active metal alloying and active metal intercalating material, and an ionically conductive protective architecture on a first surface of the anode. The architecture is composed of an active metal ion conducting separator layer with a non-aqueous anolyte, the separator layer being chemically compatible with the active metal and in contact with the anode, and a substantially impervious ionically conductive layer chemically compatible with the separator layer and aqueous environments and in contact with the separator layer. The separator layer may include a semi-permeable membrane, for example, a microporous polymer, such as are available from Celgard, Inc. Charlotte, N.C., impregnated with an organic anolyte.

In some embodiments, the porous separator layer is flexible. For instance the separator may be a porous polymeric material layer, such as a porous polyolefin (e.g., polyethyelenes or polypropylenes), porous polytetraflouroethylene layer (e.g., expanded PTFE), porous polyethylene terepthalate (PET) or some combination thereof such as a polyolefin multi-layer (e.g., a tri-layer) or a multi-layer of a porous PET or PTFE layer combined (e.g., by lamination to another layer or some other means of adhering the layers such as using a porous adhesives or chemical dissolution bonding) with a porous polyolefin layer to provide enhanced chemical compatibility in contact with lithium metal (e.g., a bi-layer where the polyolefin layer contacts the lithium) or the PTFE layer or PET layer may be sandwiched between two different porous polymer layers (e.g., between two polyolefin layers). The porous polymer layers may be processed using dry or wet methods, as are known in the battery separator arts. In the dry process, the film can be stretched to introduce micropores. The porous polymer layer may further be a nonwoven film or coating, which is processed from polymeric fibers into a film or coating.

The porous polymeric separator material layer is not limited to polyolefins, PTFE, or PET specifically but is understood to include all types of polymers which can be fabricated into a porous material layer including polyvinylidene fluoride (PVdF), polycarbonates, cellulosics, polyurethanes, polyesters, polyethers, polyacrylates, copolyether esters, copolyether amides, polyethyelene (PE), polypropylene (PP), polyacrylates, copolyether esters, copolyether amides, chitosn, and fluoropolymers generally.

Suitable fluoropolymers include expanded PTFE as taught in U.S. Pat. No. 3,953,566, which is hereby incorporated by reference for the purpose of disclosing this composition and methods for its fabrication and use. For instance, and as described above, to stabilize the porous PTFE membrane for direct contact with lithium, the PTFE layer may be sandwiched on one or both sides by a polymer layer of different composition, e.g., a polyolefin.

In various embodiments, the porous separator serving as interlayer may be a porous polymer layer or multilayer devoid of other material additives, or in other embodiments the separator layer may be a composite of a polymer (e.g., serving as the base material layer) and a second material such as a ceramic, for example a metal oxide, (e.g., ceramic metal oxide particles) disposed in pores of the polymer layer or a porous ceramic coating or thin porous ceramic film disposed on one or both polymer surface (e.g., sandwiching the polymer layer). For instance, a nano-porous ceramic film may be used. In some embodiments, the ceramic (be it a particle or film) is non-conductive to lithium ions and in other embodiments the ceramic is a lithium ion conductor. Suitable ceramic materials which may be used as a ceramic particle in the pores of a porous layer, typically a polymeric layer, serving as the base layer of the separator include metal oxides generally, and in particular the following: alumina (e.g., $Al_2O_3$), magnesia (e.g., MgO), $LiAlO_2$, lithium oxide, titanium oxide, magnesium oxide, aluminum oxide, zirconia (i.e., zirconium oxide), hafnium oxide, iron oxide, silica, barium titanate, and yttrium oxide. Other ceramic materials which are conductive of lithium ions and may be used as a ceramic particle or porous ceramic film include lithium titanium phosphates and the like as well as lithium ion conducting garnets, as described in more detail below.

Other particularly suitable materials as a ceramic particle or ceramic film or coating are lithium ion conducting oxides having a garnet like structures. These include $Li_6BaLa_2Ta_2O_{12}$; $Li_7La_3Zr_2O_{12}$, $Li_5La_3Nb_2O_{12}$, $Li_5La_3M_2O_{12}$ (M=Nb, Ta)$Li_{7+x}A_xLa_{3-x}Zr_2O_{12}$ where A may be Zn. These materials and methods for making them are described in U.S. Patent Application Pub. No.: 2007/0148533 (application Ser. No. 10/591,714) and is hereby incorporated by reference for disclosure of these materials and methods for their making and use, and suitable garnet like structures, described, for example, in International Patent Application Pub. No.: WO/2009/003695, which is hereby incorporated by reference for disclosure of these materials and methods for their making and use. Suitable ceramic active metal ion conductors are described, for example, in U.S. Pat. No. 4,985,317 to Adachi et al., incorporated by reference herein for disclosure of these materials and methods for their making and use. $LiM_2$(PO$_4$)$_3$ where M may be Ti, Zr, Hf, Ge and related compositions such as those into which certain ion substitutions are made including $Li_{1+x}Ti_{2-x}Al_x(PO_4)_3$ and the like which are known in the lithium battery arts.

In various embodiments, the ceramic particle or porous ceramic film may be composed in whole or in part of lithium ion conductive materials which are suitable for use herein as the lithium ion conducting material of the substantially impervious membrane layer, and which are described in more detail below in the section on the second material layer (i.e., the substantially impervious layer). In other embodiments the aforementioned porous ceramic film or coating may be sandwiched between two porous polymeric layers.

While the porous separators described herein above are generally flexible, for instance having an elastic modulus (i.e., Young's modulus) in the range of less than 10 GPa, the invention is not so limited, and it is contemplated that rigid porous material layers may also serve as an interlayer (e.g., those having an elastic modulus greater than 10 GPa such). Such rigid layers include porous ceramic layers, porous metal layers, porous carbon foam layers and porous glass layers and which optionally may serve as a layer on the surface of a porous polymer layer, or porous polymer layer may be coated on the surface of the ceramic, metal or glass layer and thereon serve to provide some stability in contact with lithium metal (e.g., the surface layer a polyolefin), or the porous rigid layer (be it a polycrystalline metal oxide (e.g., a ceramic) or glass, or metal, may be sandwiched between two porous polymer layers. For instance a porous ceramic layer of alumina such as anodized alumina may be used.

In some embodiments, the ceramic particles are conductive of alkali metal ions, or conductive of electrons or otherwise insulating or semiconducting. In some embodiments, the particles may be nano particles. In some embodiments, the ceramic particles or ceramic layers may be reactive to lithium metal in contact, and thereby serve as a getter for shorting dendrites which may grow as a result of cell cycling. Suitable reactive ceramic layers include intercalation materials which may in contact with lithium metal reduce and intercalate lithium ions. Such intercalation materials are known in the lithium ion battery art and include titanium, tungsten, cobalt, and manganese oxides and the like.

In some embodiments, the porous separator layer has a polymeric base layer impregnated with a lithium ion conductive ceramic component, typically in particle form.

In some embodiments, the separator layer may be a composite of a porous polymeric base layer having ceramic filler particles disposed in pores of the base layer and further comprising a polymer capable of swelling or being gelled by a liquid electrolyte and thus serving in the separator as a gel material. Other materials which may be incorporated in the separator include ion exchange resin like materials, such as ion exchange polymeric materials, typically having functional groups that provide ion exchange properties, such as carboxylic, sulfonic and phosphonic groups. Suitable gel materials are known in the lithium battery art, and include copolymers of vinylidene fluoride with hexafluoropropylene (PVDF-HFP), poly(methyl methacrylate (PMMA), poly (acrylonitrile) (PAN) and polyethyelene oxide (PEO)

In the aforementioned embodiments, the separator layer may be further impregnated with a gelling agent, which is typically a polymer material capable of being swelled by the liquid electrolyte which is incorporated therein.

Material layers suitable for use herein as an interlayer component in the instant protected electrodes include those described in U.S. Pub. No.: 2012/0169016 to Hisano et al., published Jul. 5, 2012; U.S. Pat. No. 6,242,135 to Mushiake, U.S. Pat. Nos. 3,953,566; 4,187,390; 4,539,256; 4,429,000; 4,726,989; 4,100,238; 3,679,540, all of which are hereby incorporated by reference for disclosure of these materials, as well as those manufactured by Celgard LLC (e.g., PE, PP and PP/PE/PP), Asahi Kasei chemicals (e.g., Hipore); Entek Membranes (e.g., Separion), ExxonMobil/Tonen, SK Energy, Evonik, and DuPont (e.g., the Energain). Other suitable material layers which may serve herein as an interlayer include those which are described by S. S. Zhang in an article published in the Journal of Power of Sources 164 (2007) 351-364.

In yet other embodiments, the porous interlayer may include or be composed of an inorganic matrix material such as a porous layer composed of inorganic fibers, such as glass and/or ceramic fibers; the layer being thin (e.g., less than 50 um) or thick. In embodiments wherein the glass or ceramic fiber contacts the active metal anode, the composition of the fiber should be chemically compatible with the active metal anode; e.g., for embodiments wherein the glass or ceramic fiber contacts the lithium metal anode layer. For instance, a glass or ceramic mat is contemplated for use herein as an interlayer. Glass mats are known for their use as battery separators, especially for lead acid batteries (e.g., an AGM separator). AGM stands for absorptive glass mat and it generally a non-woven fabric made with glass microfibers.

In addition to microporous separator layers, non-woven fabric type separators may be used as an interlayer or interlayer component herein, including those described in U.S. Pat. No. 5,002,843 to Cieslak, which discloses aramid fibers in a non-woven mat format, and is hereby incorporated by reference. Other non-woven fabric type separators may be composed of glass or other inorganic or organic (e.g., polymeric fiber) fiber like materials. For instance, this may include non-woven polyesters and the like. In various embodiments the interlayer is a solid polymer electrolyte such as polyethylene oxide (PEO) and derivatives and blends thereof having a lithium salt (e.g., Li-TFSI) dissolved therein. These include blends such as block co-polymers of e.g., polystyrene (PS)-block-polyethylene oxide-block-polystyrene copolymers. Polymers based on block copolymers of PS and PEO are disclosed in U.S. patent application Ser. No. 12/225,934 and other useful compositions are disclosed in US Patent Publication No.: 20130066025, US Patent Publication No.: 20110318648 and US Patent Publication No.: 20130273419. Suitable lithium salts for the solid polymer anolyte interlayer, which are also suitable for anolytes based on various non-aqueous liquid solvents, include lithium trifluoromethansulfonate ($LiCF_3SO_3$), lithium bis(trifluoromethanesulfonimidate) ($Li(CF_3SO_2)_2N$); lithium bis(trifluoromethanesulfonimide) ($Li(C_2F_5SO_2)_2N$, lithium perchlorate ($LiClO_4$), and lithium bis(oxalato)borate ($LiB(C_2O_4)_2$). The solid polymer electrolyte may be modified by adding a plasticizer such as succinonitrile, polysquarate, EC, PC or some combination thereof, which reduces crystallization and thus generally increases conductivity, especially near room temperature.

The protective architecture of this invention incorporates a substantially impervious layer of an active metal ion conducting glass or glass-ceramic (e.g., a lithium ion conductive glass-ceramic (LIC-GC)) that has high active metal ion conductivity and stability to aggressive electrolytes that vigorously react with lithium metal, for example) such as aqueous electrolytes. Suitable materials are substantially impervious, ionically conductive and chemically compatible with aqueous electrolytes or other electrolyte (catholyte) and/or cathode materials that would otherwise adversely react with lithium metal, for example. Such glass or glass-ceramic materials are substantially gap-free, non-swellable and are inherently ionically conductive. That is, they do not depend on the presence of a liquid electrolyte or other agent for their ionically conductive properties. They also have high ionic conductivity, at least $10^{-7}$ S/cm, generally at least $10^{-6}$ S/cm, for example at least $10^{-5}$ S/CM to $10^{-4}$ S/cm, and as high as $10^{-3}$ S/cm or higher so that the overall ionic conductivity of the multi-layer protective structure is at least $10^{-7}$ S/cm and as high as $10^{-3}$ S/cm or higher. The thickness of the layer is preferably about 0.1 to 1000 microns, or, where the ionic conductivity of the layer is about $10^{-7}$ S/cm, about 0.25 to 1 micron, or, where the ionic conductivity of the layer is between about $10^{-4}$ about $10^{-3}$ S/cm, about 10 to 1000 microns, preferably between 1 and 500 microns, and more preferably between 10 and 100 microns, for example 20 microns.

Suitable examples of suitable substantially impervious lithium ion conducting layers include glassy or amorphous metal ion conductors, such as a phosphorus-based glass, oxide-based glass, phosphorus-oxynitride-based glass, sulpher-based glass, oxide/sulfide based glass, selenide based glass, gallium based glass, germanium-based glass or boracite glass (such as are described D. P. Button et al., Solid State Ionics, Vols. 9-10, Part 1, 585-592 (December 1983); ceramic active metal ion conductors, such as lithium beta-alumina, sodium beta-alumina, Li superionic conductor (LISICON), Na superionic conductor (NASICON), and the like; or glass-ceramic active metal ion conductors. Specific examples include LiPON, $Li_3PO_4.Li_2S.SiS_2$, $Li_2S.GeS_2.Ga_2S_3$, $Li_2O.11Al_2O_3$, $Na_2O.11Al_2O_3$, (Na, Li)$_{1+x}$Ti$_{2-x}$Al$_x$(PO$_4$)$_3$ ($0.6 \le x \le 0.9$) and crystallographically related structures, $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, $Li_5ZrP_3O_{12}$, $Li_5TiP_3O_{12}$, $Li_3Fe_2P_3O_{12}$ and $Li_4NbP_3O_{12}$, and combinations thereof, optionally sintered or melted. Suitable ceramic ion active metal ion conductors are described, for example, in U.S. Pat. No. 4,985,317 to Adachi et al., incorporated by reference herein in its entirety and for all purposes.

A particularly suitable glass-ceramic material for the substantially impervious layer of the protective architecture is a lithium ion conductive glass-ceramic having the following composition:

| Composition | mol % |
| --- | --- |
| $P_2O_5$ | 26-55% |
| $SiO_2$ | 0-15% |
| $GeO_2 + TiO_2$ | 25-50% |
| in which $GeO_2$ | 0-50% |
| $TiO_2$ | 0-50% |
| $ZrO_2$ | 0-10% |
| $M_2O_3$ | 0-10% |
| $Al_2O_3$ | 0-15% |
| $Ga_2O_3$ | 0-15% |
| $Li_2O$ | 3-25% | and containing a predominant crystalline phase composed of $Li_{1+x}(M,Al,Ga)_x(Ge_{1-y}Ti_y)_{2-x}(PO_4)_3$ where $X \le 0.8$ and $0 \le Y \le 1.0$, and where M is an element selected from the group consisting of Nd, Sm, Eu, Gd, Tb, Dy, Ho, Er, Tm and Yb, and/or $Li_{1+x+y}Q_xTi_{2-x}Si_yP_{3-y}O_{12}$ where $0<X\le0.4$ and $0<Y\le0.6$, and where Q is Al or Ga. The glass-ceramics are obtained by melting raw materials to a melt, casting the melt to a glass and subjecting the glass to a heat treatment. Such materials are available from OHARA Corporation, Japan and are further described in U.S. Pat. Nos. 5,702,995, 6,030,909, 6,315,881 and 6,485,622, incorporated herein by reference for disclosure of these materials and methods of making them.

Such lithium ion conductive substantially impervious layers and techniques for their fabrication and incorporation in battery calls are described in U.S. Provisional Patent Application No. 60/418,899, filed Oct. 15, 2002, titled IONICALLY CONDUCTIVE COMPOSITES FOR PROTECTION OF ANODES AND ELECTROLYTES, its corresponding U.S. patent application Ser. No. 10/686,189, filed Oct. 14, 2003, and titled IONICALLY CONDUCTIVE COMPOSITES FOR PROTECTION OF ACTIVE METAL ANODES, U.S. patent application Ser. No. 10/731,771, filed Dec. 5, 2003, and titled IONICALLY CONDUCTIVE COMPOSITES FOR PROTECTION OF ACTIVE METAL ANODES, and U.S. patent application Ser. No. 10/772,228, filed Feb. 3, 2004, and titled IONICALLY CONDUCTIVE MEMBRANES FOR PROTECTION OF ACTIVE METAL ANODES AND BATTERY CELLS. These applications are incorporated by reference herein in their entirety for all purposes.

Another particularly suitable material for the second layer of the protective composite is a lithium ion conducting oxide having a garnet like structure. These include $Li_6BaLa_2Ta_2O_{12}$; $Li_7La_3Zr_2O_{12}$, $Li_5La_3Nb_2O_{12}$, $Li_5La_3M_2O_{12}$ (M=Nb, Ta)$Li_{7+x}A_xLa_{3-x}Zr_2O_{12}$ where A may be Zn. These materials and methods for making them are described in U.S. Patent Application Pub. No.: 2007/0148533 (application Ser. No. 10/591,714) and is hereby incorporated by reference, and suitable garnet like structures, are described in International Patent Application Pub. No.: WO/2009/003695 which is hereby incorporated by reference.

A critical limitation in the use of these highly conductive glasses and glass-ceramics in lithium (or other active metal or active metal intercalation) batteries is their reactivity to lithium metal or compounds incorporating lithium with a potential near that (e.g., within about a volt) of lithium metal. The non-aqueous electrolyte interlayer of the present invention isolates the lithium (for example) electrode from reacting with the glass or glass-ceramic membrane. The non-aqueous interlayer may have a semi-permeable membrane, such as a Celgard micro-porous separator, to prevent mechanical contact of the lithium electrode to the glass or glass-ceramic membrane. The membrane is impregnated with organic liquid electrolyte (anolyte) with solvents such as ethylene carbonate (EC), propylene carbonate (PC), 1,2-dimethoxy ethane (DME), 1,3-dioxolane (DIOX), or various ethers, glymes, lactones, sulfones, sulfolane, or mixtures thereof. It may also or alternatively have a polymer electrolyte, a gel-type electrolyte, or a combination of these. The important criteria are that the lithium electrode is stable in the non-aqueous anolyte, the non-aqueous anolyte is sufficiently conductive to $Li^+$ ions, the lithium electrode does not directly contact the glass or glass-ceramic membrane, and the entire assembly allows lithium ions to pass through the glass or glass-ceramic membrane.

In various embodiments the liquid impermeable solid electrolyte membrane (i.e., the substantially impervious layer) may be a glass, glass-ceramic or ceramic membrane composed in whole or in part of an active metal ion conducting solid-state electrolyte material. For instance, the membrane fabricated by sintering a pellet or tape cast layer of said solid-state electrolyte material, including sintering of a tape cast glass material that in the process of densification during sintering crystallizes to a highly conductive phase.

Particularly suitable solid-state electrolyte materials include the following:

(i) garnet like compounds as described in PCT Patent Application WO 2013/010692 having Robert Bosch GMBH as applicant and inventors Eisele, Koehler, Hinderberger, Logeat, and Kozinsky and which is herein incorporated by reference:

$$Li_n[A_{(3-a'-a'')}A'_{(a')}A''_{(a'')}][B_{(2-b'-b'')}B'_{(b')}B''_{(b'')}][C'_{(c')}C''_{(c'')}]O_{12} \text{ wherein}$$

A represents at least one element selected from the group consisting of La, Y, Pr, Nd, Sm, Eu, Gd, Tb, Dy, Ho, Er, Tm and Yb;

A' represents at least one element selected from the group consisting of Ca, Sr, and Ba;

A" represents at least one element selected from the group consisting of Na and K;

with $0 \le a' < 2$ and $0 \le a'' < 1$

B represents at least one element selected from the group consisting of Zr, Hf, and Sn;

B' represents at least one element selected from the group consisting of Ta, Nb, Sb, and Bi;

B" represents at least one element selected from the group consisting of Te, W, and Mo with $0 \le b' \le 2$ and $0 \le b'' \le 2$;

C' represents at least one element selected from the group consisting of Al and Ga;

C" represents at least one element selected from the group consisting of Si and Ge;

with $0 \le c' \le 0.5$ and $0 \le c'' \le 0.4$ and $n=7+a'+2a''-b'-2b''-3c'-4c''$ and $5.5 \le n \le 6.875$ (or $5 \le n \le 7$).

Particular examples include but are not limited to:
$Li_{6.875}La_3Ta_{0.125}Zr_{1.875}O_{12}$;
$Li_{6.75}La_3Ta_{0.25}Zr_{1.75}O_{12}$; $Li_{6.5}La_3Ta_{0.5}Zr_{1.5}O_{12}$;
$Li_{6.25}La_3Ta_{0.75}Zr_{1.25}O_{12}$; $Li_6La_3TaZrO_{12}$;
$Li_{5.5}La_3Ta_{1.5}Zr_{0.5}O_{12}$; $Al_{0.1}Li_{6.7}La_3Zr_2O_{12}$;
$Al_{0.17}Li_{6.49}La_3Zr_2O_{12}$; $Al_{0.23}Li_{6.31}La_3Zr_2O_{12}$;
$Al_{0.29}Li_{6.13}La_3Zr_2O_{12}$; $Al_{0.35}Li_{5.95}La_3Zr_2O_{12}$;
$Al_{0.3}Li_{5.85}Sr_{0.25}La_{2.75}Nb_{0.5}Zr_{1.5}O_{12}$;
$Si_{0.2}Li_{6.2}La_3Zr_2O_{12}$ (ii) garnet like compounds as described in U.S. Patent Application Pub. No.: 2011/0244337 having Kabushiki Kaisha Toyota Chuo Kenkyusho as assignee and inventors Ohta, Kobayashi, Asaoka, Asai, and which is herein incorporated by reference:

$$Li_{5+x}La_3(Zr_X,A_{2-X})O_{12} \text{ wherein}$$

A is at least one selected from the group consisting of Sc, Ti, V, Y, Nb, Hf, Ta, Al, Si, Ga, Ge, and Sn and X satisfies the inequality $1.4 \le X < 2$; or A is one obtained by substituting an element having an ionic radius different from that of Zr for Zr sites in a garnet type lithium ion conducting oxide represented by the formula $Li_7La_3Zr_2O_{12}$.

(iii) garnet like compounds as described in U.S. Pat. No. 8,092,941 having Werner Weppner as assignee and inventors Weppner and Thangadurai, and which is herein incorporated by reference:

$$Li_{5+x}A_yG_z,M_2O_{12} \text{ wherein}$$

A is in each case independently a monovalent, divalent, trivalent, or tetravalent cation (e.g. A is an alkaline earth metal or transition metal such as Ca, Sr, Ba, Mg and/or Zn;

G is in each case independently a monovalent, divalent, trivalent, or tetravalent cation (e.g. La);

M is in each case independently a trivalent, tetravalent, or pentavalent cation;

with $0<x\leq3$, $0<y\leq3$, and $0<z\leq3$ (e.g. a transition metal such as Nb, Ta, Sb and V); and O can be partially or completely replaced by divalent and/or trivalent anions such as e.g. $N^{3-}$; and furthermore, within a structure of this formal composition L, A, G and M can each be the same or different.

For example, $Li_{5+x}A_yG_{3-x}M_2O_{12}$ [such as $Li_6ALa_2M_2O_{12}$, e.g., $Li_6ALa_2Ta_2O_{12}$ (A=Sr, Ba)]

(iv) garnet like compounds as described in U.S. Patent Pub. No.: 2011/0053002 having NGK Insulators, Ltd., as assignee and inventors Yamamura, Hattori, Yoshida, Honda, and Sato, and which is herein incorporated by reference, for instance a ceramic material containing:

(a) Li, La, Zr, Nb, O; or (b) Li, La, Zr, Ta, O; or (c) Li, La, Zr, Nb, Ta, O. For example, $Li_aLa_bZr_xM_yO_c$ wherein M represents the total number of moles of Nb and Ta, the molar ratios of the constitutive metal elements containing Nb and Ta can be set to be a:b:x+y:y=7:3:2:0.1 or greater to 0.6 or lower. In addition the ceramic material may contain Al (e.g., $Li_aLa_bZr_xM_yO_czAl$ (wherein M represents the total number of moles of Nb and Ta and the molar ratios of the constitutive metal elements can be set to be a:b:x+y:z=7:3:2:0.025 or greater to 0.35 or lower.

(v) garnet like compounds as described in U.S. Patent Pub. No.: 2010/0203383 having BASF SE, as assignee and inventor Werner Weppner, and which is herein incorporated by reference, for instance a compound having the general formula:

$Li_{7+x}A_xG_{3-x}Zr_2O_{12}$ wherein

A is in each case independently a divalent cation (or combination of such cations, preferably divalent metal cations such as alkaline earth metal ions such as Ca, Sr, Ba, and/or Mg and also divalent cations such as Zn);

G is in each case independently a trivalent cation (or combination of such cations, with preference given to La);

with $0\leq x\leq3$ (and preference is given to $0\leq x\leq2$ and in particular $0\leq x\leq1$); and O can be partly or completely replaced by divalent or trivalent anions such as $N^{3-}$ (vi) nasicon like compounds as described in U.S. Pat. No. 4,985,317 having Japan Synthetic Rubber Co., Ltd. as assignee and inventors Adachi, Imanaka, Aono, Sugimoto, Sadaoka, Yasuda, Hara, Nagata, and which is herein incorporated by reference, for instance a compound (sometimes referred to as LTP) having the general formula:

(a) $Li_{1+x}M_xTi_{2-x}(PO_4)_3$ wherein

M is at least one element selected from the group consisting of Fe, Al and rare earth elements and x is a number from 0.1 to 1.9; or (b) $Li_{1+y}Ti_2Si_yP_{3-y}O_{12}$ wherein y is a number from 0.1 to 2.9; or (c) or some combination of (a) and (b)

(vii) lithium ion conductive compounds having the following composition:

| Composition | Mol % |
| --- | --- |
| $P_2O_5$ | 26-55% |
| $SiO_2$ | 0-15% |
| $GeO_2$ and $TiO_2$ | 25-50% |
| in which $TiO_2$ | 0-50% |
| in which $GeO_2$ | 0-50% |
| $ZrO_2$ | 0-10% |
| $M_2O_3$ | $0<10\%$ |
| $Al_2O_3$ | 0-15% |
| $Ga_2O_3$ | 0-15% |
| $Li_2O$ | 3-25% |

And in particular lithium ion conductive compounds having the following general formula:

$Li_{1+x}(M,Al,Ga)_x(Ge_{1-y}Ti_y)_{2-x}(PO_4)_3$ where $x\leq0.8$ and $0\leq y\leq1.0$ and where M is an element selected from the group consisting of Nd, Sm, Eu, Gd, Tb, Dy, Ho, Er, Tm and Yb and/or $Li_{1+x+y}Q_xTi_{2-x}Si_yP_{3-y}O_{12}$ where $0<x\leq0.4$ and $0<y\leq0.6$ and where Q is Al or Ga. For example $Li_{(1+x)}Al_xTi_{2-x}(PO_4)_3$ where X is 0 to 0.8 as described in U.S. Pat. No. 5,702,995 having Kabushiki Kaisha Ohara as assignee and inventor Jie Fu, and which is herein incorporated by reference.

Other suitable materials include glassy or amorphous metal ion conductors, such as a phosphorus-based glass, oxide-based glass, phosphorus-oxynitride-based glass, sulpher-based glass, oxide/sulfide based glass, selenide based glass, gallium based glass, germanium-based glass, Nasiglass; ceramic active metal ion conductors, such as lithium beta-alumina, sodium beta-alumina, Li superionic conductor (LISICON), Na superionic conductor (NASICON), and the like; or glass-ceramic active metal ion conductors. Specific examples include LiPON, $Li_3PO_4.Li_2S.SiS_2$, $Li_2S.GeS_2.Ga_2S_3$, $Li_2O.11Al_2O_3$, $Na_2O.11Al_2O_3$, $(Na,Li)_{1+x}Ti_{2-x}Al_x(PO_4)_3$ ($0.1\leq x\leq0.9$) and crystallographically related structures, $Li_{1+x}Hf_{2-x}Al_x(PO_4)_3$ ($0.1\leq x\leq0.9$), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, Na-Silicates, $Li_{0.3}La_{0.5}TiO_3$, $Na_5MSi_4O_{12}$ (M: rare earth such as Nd, Gd, Dy) $Li_5ZrP_3O_{12}$, $Li_5TiP_3O_{12}$, $Li_3Fe_2P_3O_{12}$ and $Li_4NbP_3O_{12}$, and combinations thereof, optionally sintered or melted. Suitable ceramic ion active metal ion conductors are described, for example, in U.S. Pat. No. 4,985,317 to Adachi et al., incorporated by reference herein in its entirety and for all purposes.

A particularly suitable glass-ceramic material is a lithium ion conductive glass-ceramic having the following composition:

| Composition | mol % |
| --- | --- |
| $P_2O_5$ | 26-55% |
| $SiO_2$ | 0-15% |
| $GeO_2 + TiO_2$ | 25-50% |
| in which $GeO_2$ | 0-50% |
| $TiO_2$ | 0-50% |
| $ZrO_2$ | 0-10% |
| $M_2O_3$ | 0-10% |
| $Al_2O_3$ | 0-15% |
| $Ga_2O_3$ | 0-15% |
| $Li_2O$ | 3-25% | and/or such a material containing a predominant crystalline phase composed of $Li_{1+x}(M,Al,Ga)_x(Ge_{1-y}Ti_y)_{2-x}(PO_4)_3$ where $X=0.8$ and $0=Y=1.0$, and where M is an element selected from the group consisting of Nd, Sm, Eu, Gd, Tb, Dy, Ho, Er, Tm and Yb and/or $Li_{1+x+y}Q_xTi_{2-x}Si_yP_{3-y}O_{12}$ where $0<X=0.4$ and $0<Y=0.6$, and where Q is Al or Ga. The glass-ceramics are obtained by melting raw materials to a melt, casting the melt to a glass and subjecting the glass to a heat treatment. Such materials are available from OHARA Corporation, Japan and are further described in U.S. Pat. Nos. 5,702,995, 6,030,909, 6,315,881 and 6,485,622, incorporated herein by reference.

Suitable solid-state ion conductor materials for the membrane include $Li_6BaLa_2Ta_2O_{12}$; $Li_7La_3Zr_2O_{12}$, $Li_5La_3Nb_2O_{12}$, $Li_5La_3M_2O_{12}$ (M=Nb, Ta)$Li_{7+x}A_xLa_{3-x}Zr_2O_{12}$ where A may be Zn or another transition metal. These materials and methods for making them are described in U.S. Patent Application Pub. No.: 2007/0148533 (application Ser. No. 10/591,714) and is hereby incorporated by reference in its entirety and suitable garnet like structures, are described in International Patent Application Pub. No.: WO/2009/003695, herein incorporated by reference for all that it contains.

The garnet structure can be modified by doping different elements so enhance performance such as chemical compatibility, ease of fabrication, reducing cost, and increasing conductivity. Particularly suitable substantially impervious garnet like layers include modified garnet like layers having compositions of about $Li_6SrLa_2Ta_2O_{12}$, $Li_6BaLa_2Ta_2O_{12}$, $Li_6CaLa_2Nb_2O_{12}$, $Li_6SrLa_2Nb_2O_{12}$, $Li_6BaLa_2Nb_2O_{12}$, $Li_5La_3Bi_2O_{12}$, $Li_6SrLa_2Bi_2O_{12}$, $Li_5La_3Nb_{1.9}Y_{0.1}O12$, $Li_7La_3Hf_2O_{12}$, $Li_{6.55}La_3Hf_{1.55}Ta_{0.45}O_{12}$, $Li_5Nd_3Sb_2O_{12}$, $Li_7La_3Sn_2O_{12}$, $Li_7La_3Zr_2O_{12}$, $Li_{6.75}La_3Zr_{1.75}Nb_{0.25}O_{12}$, $Li_{6.25}La_3Zr_2Ga_{0.25}O_{12}$, $Li_7La_3Zr_2O_{12}$ (LLZO) doped with Ge, Si, In, Al or some combination thereof Referring to FIG. 1, a specific embodiment of the present invention is illustrated and described. FIG. 1 shows an unscaled depiction of an electrochemical cell structure 100 having an active metal, active metal-ion, active metal alloying metal, or active metal intercalating material anode 102 and an ionically conductive protective architecture 104. The protective architecture 104 has an active metal ion conducting separator layer 106 with a non-aqueous anolyte (sometimes also referred to as a transfer electrolyte) on a surface of the anode 102 and a substantially impervious ionically conductive layer 108 in contact with the separator layer 106. The separator layer 106 is chemically compatible with the active metal and the substantially impervious layer 108 is chemically compatible with the separator layer 106 and aqueous environments. The structure 100 may optionally include a current collector 110, composed of a suitable conductive metal that does not alloy with or intercalate the active metal. When the active metal is lithium, a suitable current collector material is copper. The current collector 110 can also serve to seal the anode from ambient to prevent deleterious reaction of the active metal with ambient air or moisture.

In various embodiments the separator layer 106 is composed of a porous membrane impregnated with a non-aqueous anolyte. For example, the membrane may be a micro-porous polymer, such as are available from Celgard, Inc. The non-aqueous anolyte may be in the liquid or gel phase. For example, the anolyte may include a solvent selected from the group consisting of organic carbonates, ethers, lactones, sulfones, etc, and combinations thereof, such as EC, PC, DEC, DMC, EMC, 1,2-DME or higher glymes, THF, 2MeTHF, sulfolane, ionic liquids (as are known in the art) and combinations thereof. 1,3-dioxolane may also be used as an anolyte solvent, particularly but not necessarily when used to enhance the safety of a cell incorporating the structure, as described further below. Generally the anolyte should be chemically compatible in contact with the active metal anode, and in this regard may include compatible liquid solvents (i.e., those which are solely compatible) as well as those solvents which are not compatible by themselves but in combination with a suitable electrolytic salt and/or additional solvent(s) leads to a chemically compatible anolyte. Such liquid solvents (solely chemically compatible or otherwise) may include organic or inorganic solvents such as those described above, as well as ionic liquid solvents. For instance the chemically compatible anolyte may be composed of an ionic liquid in combination with non-aqueous organic liquid solvent(s) and an optional salt. When the anolyte is in the gel phase, gelling agents such as polyvinylidine fluoride (PVdF) compounds, hexafluoropropylene-vinylidene fluoride copolymers (PVdf-HFP), polyacrylonitrile compounds, cross-linked polyether compounds, polyalkylene oxide compounds, polyethylene oxide compounds, and combinations and the like may be added to gel the solvents. Suitable anolytes will also, of course, also include active metal salts, such as, in the case of lithium, for example, $LiPF_6$, $LiBF_4$, $LiAsF_6$, $LiSO_3CF_3$ or $LiN(SO_2C_2F_5)_2$. One example of a suitable separator layer is 1 M $LiPF_6$ dissolved in propylene carbonate and impregnated in a Celgard microporous polymer membrane.

When the anolyte is in the gel phase it may be used as a freestanding layer or otherwise as a coating on the lithium metal or on the substantially impervious layer. Both organic solvent- and ionic liquid-based gels as well as combinations thereof are contemplated for use herein as an interlayer.

As described in U.S. Pat. No. 8,332,028, other anolyte solvents including ionic liquids, and especially non-aqueous organic ionic liquids, as well as inorganic ionic liquids which are sufficiently compatible in contact with the lithium anode layer (e.g., lithium metal or lithium intercalation material, such as carbon) may be used as anolyte herein. Ionic liquids are a subclass of non-aqueous solvents and are generally known in the battery art for their use as an electrolyte component. Ionic liquids generally suitable for use herein are preferably liquids at room temperature, although the invention is not limited as such, and organic salts having melting points below 100° C. are generally contemplated. Ionic liquids are known in the art, including those based on imidazolium and pyrrolidinium. The ionic liquids will generally contain a lithium salt, such as those having a TFSI anion.

As a particular type of non-aqueous electrolyte, ionic liquid based electrolytes may be impregnated in a porous membrane (e.g., a microporous membrane) or caused to swell or gel a polymeric separator material. Typically, the ionic liquid will further comprise a lithium salt dissociated therein to provide charge carriers. In some instances the ionic liquid may be caused to polymerize, and in such instances, the polymeric ionic liquid may itself serve as the lithium ion conducting separator layer. Ionic liquid based electrolytes, including those which are caused to swell or gel a polymeric separator layer (e.g., polyvinylidene fluoride [PVdF] or poly-ethylene oxide [PEO]) are suitable for use herein and are known in the art. Ionic liquids may be classified according to their cation and anion compositions. For example ionic liquid cations which are known in the art include those of the Pyrrolidinium type (e.g., N-methyl-N-propylpyrrolidinium, N-propyl-N-methylpyrrolidinium [PYR13+], 1-butyl-1-methylpyrrolidinium [PYR14+], Imidazolium (e.g., 1-ethyl-3-methylimidazolium [EMI+]). For example ionic liquid anions which are known in the art include those of the type bis(trifluoromethanesulfonyl)imide and bis(fluorosulfonyl)imide. A particularly suitable lithium salt is that of the type lithium bis(trifluoromethanesulfonyl) imide. For example, N-Butyl-N-methylpyrrolidinium bis (trifluoromethanesulfonyl)imide [PYR14TFSI] and N-Butyl-N-methylpyrrolidinium bis(fluorosulfonyl)imide

[PYR14FSI] impregnated in a porous separator or caused to gel or swell a suitable polymer such as PEO or PVdF, and having dissolved therein the lithium salt LiTFSI. It should be understood to one of skill in the art that the search for new and improved ionic liquid based electrolytes (or electrolytes comprising ionic liquids) for use in lithium batteries is an ongoing worldwide effort, and thus it is contemplated herein that novel and hitherto unknown ionic liquids suitable for use herein as an anolyte will be discovered, and especially those having improved stability against electroactive lithium materials such as lithium metal, and thus will provide particular benefit, and by this expedient such ionic liquids are contemplated herein for use as an anolyte of the instant protected anode.

Another suitable anolyte includes a solution of a non-aqueous solvent(s) combined with a very high concentration of a lithium salt (e.g., about an equimolar complex of liquid solvent with lithium salts); for example, an about equimolar complex of a glyme (e.g., tri-glyme or tetra-glyme) and a lithium salt of lithium bis(trifluoromethanesulfonyl)amide [LiTFSA] or other such as lithium bis(trifluoromethanesulfonyl)imide LiTFSI or lithium bis(fluorosulfonyl)imide. This anolyte may behave like a concentrated solution or an ionic liquid. In some embodiments, fumed silica or other high surface area particles may be added to the solution to enhance solution properties and in some instances for making the solution behave like a semi-solid.

In various embodiments the anolyte may be in the gel phase or the anolyte may be a liquid anolyte swelled in or by a polymer layer. Such embodiments contemplate gel phase anolytes of non-aqueous organic or ionic liquid solvents typically in combination with a salt, or combinations thereof of a gel phase anolyte comprising both a non-aqueous organic liquid solvent and a suitable ionic liquid solvent as described above.

There are a number of advantages of a protective architecture in accordance with the present invention. In particular, cell structures incorporating such an architecture may be relatively easily manufactured. In one example, lithium metal is simply placed against a micro-porous separator impregnated with organic liquid or gel electrolyte and with the separator adjacent to a glass/glass ceramic active metal ion conductor.

An additional advantage of the non-aqueous interlayer is realized when glass-ceramics are used. When amorphous glasses of the type described by the OHARA Corp. patents cited above are heat-treated, the glass devitrifies, leading to the formation of a glass-ceramic. However, this heat treatment can lead to the formation of surface roughness which may be difficult to coat using vapor phase deposition of an inorganic protective interlayer such as LiPON, $Cu_3N$, etc. The use of a liquid (or gel), non-aqueous electrolyte interlayer would easily cover such a rough surface by normal liquid flow, thereby eliminating the need for surface polishing, etc. In this sense, techniques such as "draw-down" (as described by Sony Corporation and Shott Glass (T. Kessler, H. Wegener, T. Togawa, M. Hayashi, and T. Kakizaki, "Large Microsheet Glass for 40-in. Class PALC Displays," 1997, FMC2-3, incorporated herein by reference) could be used to form thin glass layers (20 to 100 microns), and these glasses heat treated to form glass-ceramics.

In yet other embodiments, the interlayer may be integrated with the second material layer (i.e., the substantially impervious layer). For instance, the second material layer may be a sintered layer of a glass, ceramic or glass ceramic and the porous interlayer integrated therewith. For example, the porous interlayer composed of a substantially similar composition and/or crystal structure as that of the second material layer (e.g., an anode compatible LTP composition or Garnet like material) except that the integrated interlayer is porous and therefore accepting of a liquid phase anolyte. For instance, the integrated structure may be fabricated by tape casting of a multi-layer (e.g., a dual layer) wherein at least one of the layers is substantially impervious and the layer opposing the anode (e.g., in direct contact) is porous. In some embodiments, the integrated structure may be further paired with an additional porous interlayer which separates the integrated layer from the anode and by this expedient allows for the use of an anode incompatible integrated structure into the protective architecture.

In other embodiments, it is contemplated that the substantially impervious layer may be formed on or in conjunction with an electronically insulating and ionically insulating porous substrate as a support layer. The substantially impervious layer may be fabricated as a coating or film on the porous support (e.g., the porous support composed of a rigid glass or polycrystalline ceramic or glass-ceramic), or it may be fabricated using multi-layer tape casting wherein one or more layers are lithium ion conductors and one or more other layers provide a porous, non-conducting support.

In addition, porous metal support layer embodiments are also contemplated. Generally when a porous metal support is used it may be positioned on the surface that opposes the external environment about the protected anode (e.g., that side which opposes the cathode). However, this embodiment is not limited as such and the porous metal support may oppose the anode, but in such embodiments an insulating generally porous polymeric separator may be incorporated between the porous metal layer and the lithium layer, for the purpose of providing electronic isolation therebetween.

In yet a further embodiment, the interlayer may effectively be provided by a gap (i.e., a space) which contains a liquid phase anolyte but no material interlayer. The gap may be incorporated in the anode structure using any number of suitable constructions, including wherein the substantially impervious membrane is attached to a frame (e.g., provided by the battery casing) at a spaced apart distance from the lithium metal layer, and the gap subsequently created there between the layers filled with liquid anolyte. In other words a liquid anolyte interlayer devoid of a porous solid material layer is contemplated herein.

Battery Cells

Figure 2:
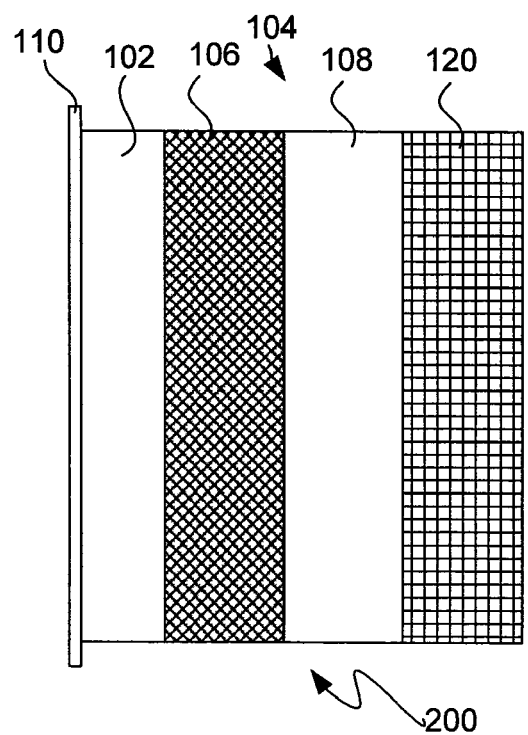
FIG. 2 is a schematic illustration of a battery cell incorporating an ionically conductive protective interlayer architecture in accordance with the present invention.

The non-aqueous interlayer architecture is usefully adopted in battery cells. For example, the electrochemical structure 100 of FIG. 1 can be paired with a cathode system 120 to form a cell 200, as depicted in FIG. 2. The cathode system 120 includes an electronically conductive component, an ionically conductive component, and an electrochemically active component. The cathode system 120 may have any desired composition and, due to the isolation provided by the protective architecture, is not limited by the anode or anolyte composition. In particular, the cathode system may incorporate components which would otherwise be highly reactive with the anode active metal, such as aqueous materials, including water, aqueous catholytes and air, metal hydride electrodes and metal oxide electrodes.

In one embodiment, a Celgard separator would be placed against one side of the thin glass-ceramic, followed by a non-aqueous liquid or gel electrolyte, and then a lithium electrode. On the other side of the glass ceramic membrane, an aggressive solvent could be used, such as an aqueous electrolyte. In such a way, an inexpensive Li/water or Li/air cell, for example, could be built.

Cathode Systems

As noted above, the cathode system 120 of a battery cell in accordance with the present invention may have any desired composition and, due to the isolation provided by the protective architecture, is not limited by the anode or anolyte composition. In particular, the cathode system may incorporate components which would otherwise be highly reactive with the anode active metal, such as aqueous materials, including water, aqueous solutions and air, metal hydride electrodes and metal oxide electrodes.

Battery cells of the present invention may include, without limitation, water, aqueous solutions, air electrodes and metal hydride electrodes, such as are described in co-pending application Ser. No. 10/772,157 titled ACTIVE METAL/AQUEOUS ELECTROCHEMICAL CELLS AND SYSTEMS, now U.S. Pat. No. 7,645,543, incorporated herein by reference in its entirety and for all purposes, and metal oxide electrodes, as used, for example, in conventional Li-ion cells.

The effective isolation between anode and cathode achieved by the protective interlayer architecture of the present invention also enables a great degree of flexibility in the choice of catholyte systems, in particular aqueous systems, but also non-aqueous systems. Since the protected anode is completely decoupled from the catholyte, so that catholyte compatibility with the anode is no longer an issue, solvents and salts which are not kinetically stable to Li can be used.

For cells using water as an electrochemically active cathode material, a porous electronically conductive support structure can provide the electronically conductive component of the cathode system. An aqueous electrolyte (catholyte) provides ion carriers for transport (conductivity) of Li ions and anions that combine with Li. The electrochemically active component (water) and the ionically conductive component (aqueous catholyte) will be intermixed as a single solution, although they are conceptually separate elements of the battery cell. Suitable catholytes for the Li/water battery cell of the invention include any aqueous electrolyte with suitable ionic conductivity. Suitable electrolytes may be acidic, for example, strong acids like HCl, $H_2SO_4$, $H_3PO_4$ or weak acids like acetic acid/Li acetate; basic, for example, LiOH; neutral, for example, sea water, LiCl, LiBr, LiI; or amphoteric, for example, $NH_4Cl$, $NH_4Br$, etc The suitability of sea water as an electrolyte enables a battery cell for marine applications with very high energy density. Prior to use, the cell structure is composed of the protected anode and a porous electronically conductive support structure (electronically conductive component of the cathode). When needed, the cell is completed by immersing it in sea water which provides the electrochemically active and ionically conductive components. Since the latter components are provided by the sea water in the environment, they need not transported as part of the battery cell prior to it use (and thus need not be included in the cell's energy density calculation). Such a cell is referred to as an "open" cell since the reaction products on the cathode side are not contained. Such a cell is, therefore, a primary cell.

Secondary Li/water cells are also possible in accordance with the invention. As noted above, such cells are referred to as "closed" cells since the reaction products on the cathode side are contained on the cathode side of the cell to be available to recharge the anode by moving the Li ions back across the protective membrane when the appropriate recharging potential is applied to the cell.

As noted above and described further below, in another embodiment of the invention, ionomers coated on the porous catalytic electronically conductive support reduce or eliminate the need for ionic conductivity in the electrochemically active material.

The electrochemical reaction that occurs in a Li/water cell is a redox reaction in which the electrochemically active cathode material gets reduced. In a Li/water cell, the catalytic electronically conductive support facilitates the redox reaction. As noted above, while not so limited, in a Li/water cell, the cell reaction is believed to be:

$$Li+H_2O=LiOH+\tfrac{1}{2}H_2.$$

The half-cell reactions at the anode and cathode are believed to be:

Anode: $Li=Li^++e^-$

Cathode: $e^-+H_2O=OH^-+\tfrac{1}{2}H_2$

Accordingly, the catalyst for the Li/water cathode promotes electron transfer to water, generating hydrogen and hydroxide ion. A common, inexpensive catalyst for this reaction is nickel metal; precious metals like Pt, Pd, Ru, Au, etc. will also work but are more expensive.

Also considered to be within the scope of Li (or other active metal)/water batteries of this invention are batteries with a protected Li anode and an aqueous electrolyte composed of gaseous and/or solid oxidants soluble in water that can be used as active cathode materials (electrochemically active component). Use of water soluble compounds, which are stronger oxidizers than water, can significantly increase battery energy in some applications compared to the lithium/water battery, where during the cell discharge reaction, electrochemical hydrogen evolution takes place at the cathode surface. Examples of such gaseous oxidants are $O_2$, $SO_2$ and $NO_2$. Also, metal nitrites, in particular $NaNO_2$ and $KNO_2$ and metal sulfites such as $Na_2SO_3$ and $K_2SO_3$ are stronger oxidants than water and can be easily dissolved in large concentrations. Another class of inorganic oxidants soluble in water are peroxides of lithium, sodium and potassium, as well as hydrogen peroxide $H_2O_2$.

The use of hydrogen peroxide as an oxidant can be especially beneficial. There are at least two ways of utilizing hydrogen peroxide in a battery cell in accordance with the present invention. First of all, chemical decomposition of hydrogen peroxide on the cathode surface leads to production of oxygen gas, which can be used as active cathode material. The second, perhaps more effective way, is based on the direct electroreduction of hydrogen peroxide on the cathode surface. In principal, hydrogen peroxide can be reduced from either basic or acidic solutions. The highest energy density can be achieved for a battery utilizing hydrogen peroxide reduction from acidic solutions. In this case a cell with Li anode yields $E^0$=4.82 V (for standard conditions) compared to $E^0$=3.05 V for Li/Water couple. However, because of very high reactivity of both acids and hydrogen peroxide to unprotected Li, such cell can be practically realized only for protected Li anode such as in accordance with the present invention.

For cells using air as an electrochemically active cathode material, the air electrochemically active component of these cells includes moisture to provide water for the electrochemical reaction. The cells have an electronically conductive support structure electrically connected with the anode to allow electron transfer to reduce the air cathode active material. The electronically conductive support structure is generally porous to allow fluid (air) flow and either catalytic or treated with a catalyst to catalyze the reduction of the cathode active material. An aqueous electrolyte with suitable ionic conductivity or ionomer is also in contact with the electronically conductive support structure to allow ion transport within the electronically conductive support structure to complete the redox reaction.

The air cathode system includes an electronically conductive component (for example, a porous electronic conductor), an ionically conductive component with at least an aqueous constituent, and air as an electrochemically active component. It may be any suitable air electrode, including those conventionally used in metal (e.g., Zn)/air batteries or low temperature (e.g., PEM) fuel cells. Air cathodes used in metal/air batteries, in particular in Zn/air batteries, are described in many sources including "Handbook of Batteries" (Linden and T. B. Reddy, McGraw-Hill, NY, Third Edition) and are usually composed of several layers including an air diffusion membrane, a hydrophobic Teflon layer, a catalyst layer, and a metal electronically conductive component/current collector, such as a Ni screen. The catalyst layer also includes an ionically conductive component/electrolyte that may be aqueous and/or ionomeric. A typical aqueous electrolyte is composed of KOH dissolved in water. A typical ionomeric electrolyte is composed of a hydrated (water) Li ion conductive polymer such as a per-fluorosulfonic acid polymer film (e.g., du Pont NAFION). The air diffusion membrane adjusts the air (oxygen) flow. The hydrophobic layer prevents penetration of the cell's electrolyte into the air-diffusion membrane. This layer usually contains carbon and Teflon particles. The catalyst layer usually contains a high surface area carbon and a catalyst for acceleration of reduction of oxygen gas. Metal oxides, for example $MnO_2$, are used as the catalysts for oxygen reduction in most of the commercial cathodes. Alternative catalysts include metal macrocycles such as cobalt phthalocyanine, and highly dispersed precious metals such at platinum and platinum/ruthenium alloys. Since the air electrode structure is chemically isolated from the active metal electrode, the chemical composition of the air electrode is not constrained by potential reactivity with the anode active material. This can allow for the design of higher performance air electrodes using materials that would normally attack unprotected metal electrodes.

Another type of active metal/aqueous battery cell incorporating a protected anode and a cathode system with an aqueous component in accordance with the present invention is a lithium (or other active metal)/metal hydride battery. For example, lithium anodes protected with a non-aqueous interlayer architecture as described herein can be discharged and charged in aqueous solutions suitable as electrolytes in a lithium/metal hydride battery. Suitable electrolytes provide a source or protons. Examples include aqueous solutions of halide acids or acidic salts, including chloride or bromide acids or salts, for example HCl, HBr, $NH_4Cl$ or $NH_4Br$.

In addition to the aqueous, air, etc., systems noted above, improved performance can be obtained with cathode systems incorporating conventional Li-ion battery cathodes and electrolytes, such as metal oxide cathodes (e.g., $Li_xCoO_2$, $Li_xNiO_2$, $Li_xMn_2O_4$ and $LiFePO_4$) and the binary, ternary or multicomponent mixtures of alkyl carbonates or their mixtures with ethers as solvents for a Li metal salt (e.g., $LiPF_6$, $LiAsF_6$ or $LiBF_4$); or Li metal battery cathodes (e.g., elemental sulfur or polysulfides) and electrolytes composed of organic carbonates, ethers, glymes, lactones, sulfones, sulfolane, and combinations thereof, such as EC, PC, DEC, DMC, EMC, 1,2-DME, THF, 2MeTHF, and combinations thereof, as described, for example, in U.S. Pat. No. 6,376,123, incorporated herein by reference.

Moreover, the catholyte solution can be composed of only low viscosity solvents, such as ethers like 1,2-dimethoxy ethane (DME), tetrahydrofuran (THF), 2-methyltetrahydrofuran, 1,3-dioxolane (DIOX), 4-methyldioxolane (4-Me-DIOX) or organic carbonates like dimethylcarbonate (DMC), ethylmethylcarbonate (EMC), diethylcarbonate (DEC), or their mixtures. Also, super low viscosity ester solvents or co-solvents such as methyl formate and methyl acetate, which are very reactive to unprotected Li, can be used. As is known to those skilled in the art, ionic conductivity and diffusion rates are inversely proportional to viscosity such that all other things being equal, battery performance improves as the viscosity of the solvent decreases. The use of such catholyte solvent systems significantly improves battery performance, in particular discharge and charge characteristics at low temperatures.

Ionic liquids may also be used in catholytes of the present invention. Ionic liquids are organic salts with melting points under 100 degrees, often even lower than room temperature. The most common ionic liquids are imidazolium and pyridinium derivatives, but also phosphonium or tetralkylammonium compounds are also known. Ionic liquids have the desirable attributes of high ionic conductivity, high thermal stability, no measurable vapor pressure, and non-flammability. Representative ionic liquids are 1-Ethyl-3-methylimidazolium tosylate (EMIM-Ts), 1-Butyl-3-methylimidazolium octyl sulfate (BMIM-OctSO4), 1-Ethyl-3-methylimidazolium hexafluorophosphate, and 1-Hexyl-3-methylimidazolium tetrafluoroborate. Although there has been substantial interest in ionic liquids for electrochemical applications such as capacitors and batteries, they are unstable to metallic lithium and lithiated carbon. However, protected lithium anodes as described in this invention are isolated from direct chemical reaction, and consequently lithium metal batteries using ionic liquids are possible as an embodiment of the present invention. Such batteries should be particularly stable at elevated temperatures.

Safety Additives

As a safety measure, the non-aqueous interlayer architecture can incorporate a gelling/polymerizing agent that, when in contact with the reactive electrolyte (for example water), leads to the formation of an impervious polymer on the anode (e.g., lithium) surface. This safety measure is used for the case where the substantially impervious layer of the protective architecture (e.g., a glass or glass-ceramic membrane) cracks or otherwise breaks down and allows the aggressive catholyte to enter and approach the lithium electrode raising the possibility of a violent reaction between the Li anode and aqueous catholyte.

Such a reaction can be prevented by providing in the anolyte a monomer for a polymer that is insoluble or minimally soluble in water, for example dioxolane (Diox) (for example, in an amount of about 5-20% by volume) and in the catholyte a polymerization initiator for the monomer, for example, a protonic acid. A Diox based anolyte may be composed of organic carbonates (EC, PC, DEC, DMC, EMC), ethers (1, 2-DME, THF, 2MeTHF, 1,3-dioxolane and others) and their mixtures. Anolyte comprising dioxolane as a main solvent (e.g., 50-100% by volume) and Li salt, in particular, $LiAsF_6$, $LiBF_4$, $LiSO_3CF_3$, $LiN(SO_2C_2F_5)_2$, is especially attractive. Diox is a good passivating agent for Li surface, and good cycling data for Li metal has been achieved in the Diox based electrolytes (see, e.g., U.S. Pat. No. 5,506,068). In addition to its compatibility with Li metal, Diox in combination with above-mentioned ionic salts forms highly conductive electrolytes. A corresponding aqueous catholyte contains a polymerization initiator for Diox that produces a Diox polymerization product (polydioxolane) that is not or is only minimally soluble in water.

If the membrane breaks down, the catholyte containing the dissolved initiator comes in direct contact with the Diox based anolyte, and polymerization of Diox occurs next to the Li anode surface. Polydioxolane, which is a product of Diox polymerization, has high resistance, so the cell shuts down. In addition, the Polydioxolane layer formed serves as a barrier preventing reaction between the Li surface and the aqueous catholyte. Diox can be polymerized with protonic acids dissolved in the catholyte. Also, the water soluble Lewis acids, in particular benbenzoyl cation, can serve this purpose.

Thus, improvement in cyclability and safety is achieved by the use of a dioxolane (Diox) based anolyte and a catholyte containing a polymerization initiator for Diox.

Active Metal Ion and Alloy Anodes

The invention pertains to batteries and other electrochemical structures having anodes composed of active metals, as described above. A preferred active metal electrode is composed of lithium (Li). Suitable anolytes for these structures and cells are described above.

The invention also pertains to electrochemical structures having active metal ion (e.g., lithium-carbon) or active metal alloy (e.g., Li—Sn) anodes. Some structures may initially have uncharged active metal ion intercalation materials (e.g., carbon) or alloying metals (e.g., tin (Sn)) that are subsequently charged with active metal or active metal ions. While the invention may be applicable to a variety of active metals, it is described herein primarily with reference to lithium, as an example.

Carbon materials commonly used in conventional Li-ion cells, in particular petroleum coke and mesocarbon microbead carbons, can be used as anode materials in Li-ion aqueous battery cells. Lithium alloys comprising one or several of the metals selected from the group including Ca, Mg, Sn, Ag, Zn, Bi, Al, Cd, Ga, In and Sb, preferably Al, Sn or Si, can also be used as anode materials for such a battery. In one particular embodiment the anode comprises Li, Cu and Sn.

Anolyte for such structures can incorporate supporting salts, for example, $LiAsF_6$, $LiClO_4$, $LiSO_3CF_3$, $LiN(CF_3SO_2)_2$ or $LiN(SO_2C_2F_5)_2$ dissolved in binary or ternary mixtures of non-aqueous solvents, for example, EC, PC, DEC, DMC, EMC, MA, MF, commonly used in conventional Li-ion cells. Gel-polymer electrolytes, for instance electrolytes comprising one of the above mentioned salts, a polymeric binder, such as PVdF, PVdF-HFP copolymer, PAN or PEO, and a plasticizer (solvent) such as EC, PC, DEC, DMC, EMC, THF, 2MeTHF, 1,2-DME and their mixtures, also can be used.

For batteries using these anodes, a suitable cathode structure may be added to the electrochemical structure on the other side of the protective architecture. The architecture enables Li-ion type cells using a number of exotic cathodes such as air, water, metal hydrides or metal oxides. For Li-ion aqueous battery cells, for example, aqueous catholyte can be basic, acidic or neutral and contains Li cations. One example of a suitable aqueous catholyte is 2 M LiCl, 1 M HCl.

During the first charge of the battery with lithium-carbon lithium alloy anode, Li cations are transported from the catholyte through the protective architecture (including the anolyte) to the anode surface where the intercalation process takes place as in conventional Li-ion cells. In one embodiment, the anode is chemically or electrochemically lithiated ex-situ before cell assembly.

Cell Designs

Electrochemical structures and battery cells in accordance with the present invention may have any suitable geometry. For example, planar geometries may be achieved by stacking planar layers of the various components of the structures or cells (anode, interlayer, cathode, etc.) according to known battery cell fabrication techniques that are readily adaptable to the present invention given the description of the structure or cell components provided herein. These stacked layers may be configured as prismatic structures or cells.

Alternatively, the use of tubular glass or glass-ceramic electrolytes with a non-aqueous interlayer architecture allows for the construction of high surface area anodes with low seal area. As opposed to flat-plate design where the seal length increases with cell surface area, tubular construction utilizes an end seal where the length of the tube can be increased to boost surface area while the seal area is invariant. This allows for the construction of high surface area Li/water and Li/air cells that should have correspondingly high power density.

The use of a non-aqueous interlayer architecture in accordance with the present invention facilitates construction. An open-ended (with a seal) or close-ended glass or glass-ceramic (i.e., substantially impervious active metal ion conductive solid electrolyte) tube is partially filled with a non-aqueous organic electrolyte (anolyte or transfer electrolyte) as described above, for example such as is typically used in lithium primary batteries A lithium metal rod surrounded by some type of physical separator (e.g., a semi-permeable polymer film such as Celgard, Tonin, polypropylene mesh, etc.) having a current collector is inserted into the tube. A simple epoxy seal, glass-to-metal seal, or other appropriate seal is used to physically isolate the lithium from the environment.

Figure 3A:
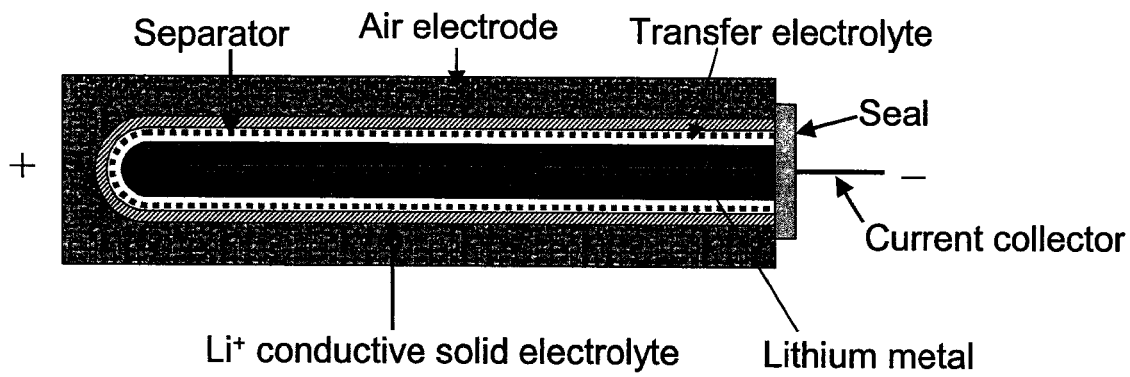
FIGS. 3A-C illustrate embodiments of battery cells in accordance with the present invention that use a tubular protected anode design.
Figure 3B:
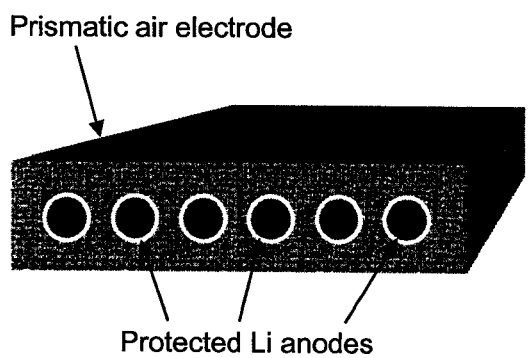

The protected anode can then be inserted in a cylindrical air electrode to make a cylindrical cell, as shown in FIG. 3A. Or an array of anodes might be inserted into a prismatic air electrode, as shown in FIG. 3B.

This technology can also be used to build Li/water, Li/metal hydride or Li/metal oxide cells by substituting the air electrode with suitable aqueous, metal hydride or metal oxide cathode systems, as described herein above.

Figure 3C:
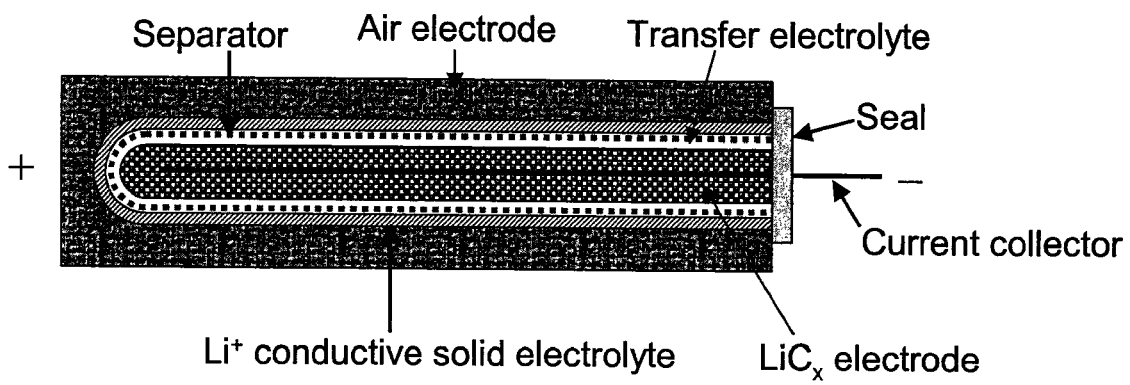

In addition to the use of lithium metal rods or wires (in capillary tubes), this invention can also be used to isolate a rechargeable $LiC_x$ anode from aqueous or otherwise corrosive environments. In this case, appropriate anolyte (transfer electrolyte) solvents are used in the tubular anode to form a passive film on the lithiated carbon electrode. This would allow the construction of high surface area Li-ion type cells using a number of exotic cathodes such as air, water, metal hydrides or metal oxides, for example, as shown in FIG. 3C.

EXAMPLES

The following examples provide details illustrating advantageous properties of Li metal and Li-ion aqueous battery cells in accordance with the present invention. These examples are provided to exemplify and more clearly illustrate aspects of the present invention and in no way intended to be limiting.

Example 1: Li/Seawater Cell

Figure 4:
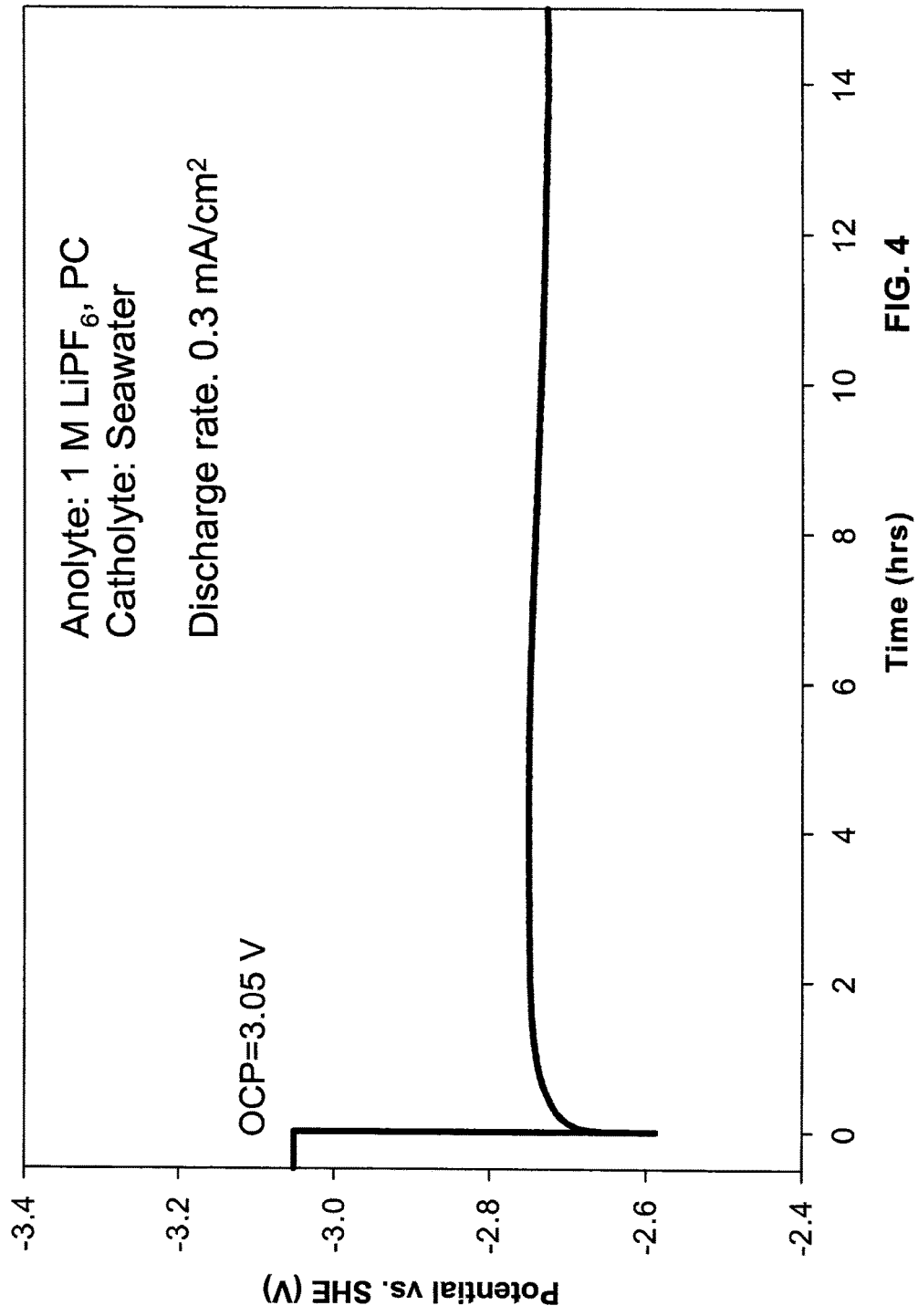
FIGS. 4-6 are plots of data illustrating the performance of various cells incorporating anodes with ionically conductive protective interlayer architecture in accordance with the present invention.

A series of experiments was performed in which the commercial ionically conductive glass-ceramic from OHARA Corporation was used as a membrane separating aqueous catholyte and non-aqueous anolyte. The cell structure was Li/non-aqueous electrolyte/glass-ceramic/aqueous electrolyte/Pt. A lithium foil from Chemetall Foote Corporation with thickness of 125 microns was used as the anode. The GLASS-CERAMIC plates were in the range of 0.3 to 0.48 mm in thickness. The GLASS-CERAMIC plate was fitted into an electrochemical cell by use of two o-rings such that the GLASS-CERAMIC plate was exposed to an aqueous environment from one side and a non-aqueous environment from the other side. In this case, the aqueous electrolyte comprised an artificial seawater prepared with 35 ppt of "Instant Ocean" from Aquarium Systems, Inc. The conductivity of the seawater was determined to be 4.5 $10^{-2}$ S/cm. A microporous Celgard separator placed on the other side of the GLASS-CERAMIC was filled with non-aqueous electrolyte comprised of 1 M $LiPF_6$ dissolved in propylene carbonate. The loading volume of the nonaqueous electrolyte was 0.25 ml per 1 $cm^2$ of Li electrode surface. A platinum counter electrode completely immersed in the sea water catholyte was used to facilitate hydrogen reduction when the battery circuit was completed. An Ag/AgCl reference electrode was used to control potential of the Li anode in the cell. Measured values were recalculated into potentials in the Standard Hydrogen Electrode (SHE) scale. An open circuit potential (OCP) of 3.05 volts corresponding closely to the thermodynamic potential difference between $Li/Li^+$ and $H_2/H^+$ in water was observed (FIG. 4). When the circuit was closed, hydrogen evolution was seen immediately at the Pt electrode, which was indicative of the anode and cathode electrode reactions in the cell, $2Li=2Li+2e^-$ and $2H^+ + 2e^- = H_2$. The potential-time curve for Li anodic dissolution at a discharge rate of 0.3 $mA/cm^2$ is presented in FIG. 2. The results indicate an operational cell with a stable discharge voltage. It should be emphasized that in all experiments using a Li anode in direct contact with seawater utilization of Li was very poor, and such batteries could not be used at all at low and moderate current densities similar to those used in this example due to the extremely high rate of Li corrosion in seawater (over 19 $A/cm^2$).

Example 2: Li/Air Cell

The cell structure was similar to that in the previous example, but instead of a Pt electrode completely immersed in the electrolyte, this experimental cell had an air electrode made for commercial Zn/Air batteries. An aqueous electrolyte used was 1 M LiOH. A Li anode and a non-aqueous electrolyte were the same as described in the previous example.

Figure 5:
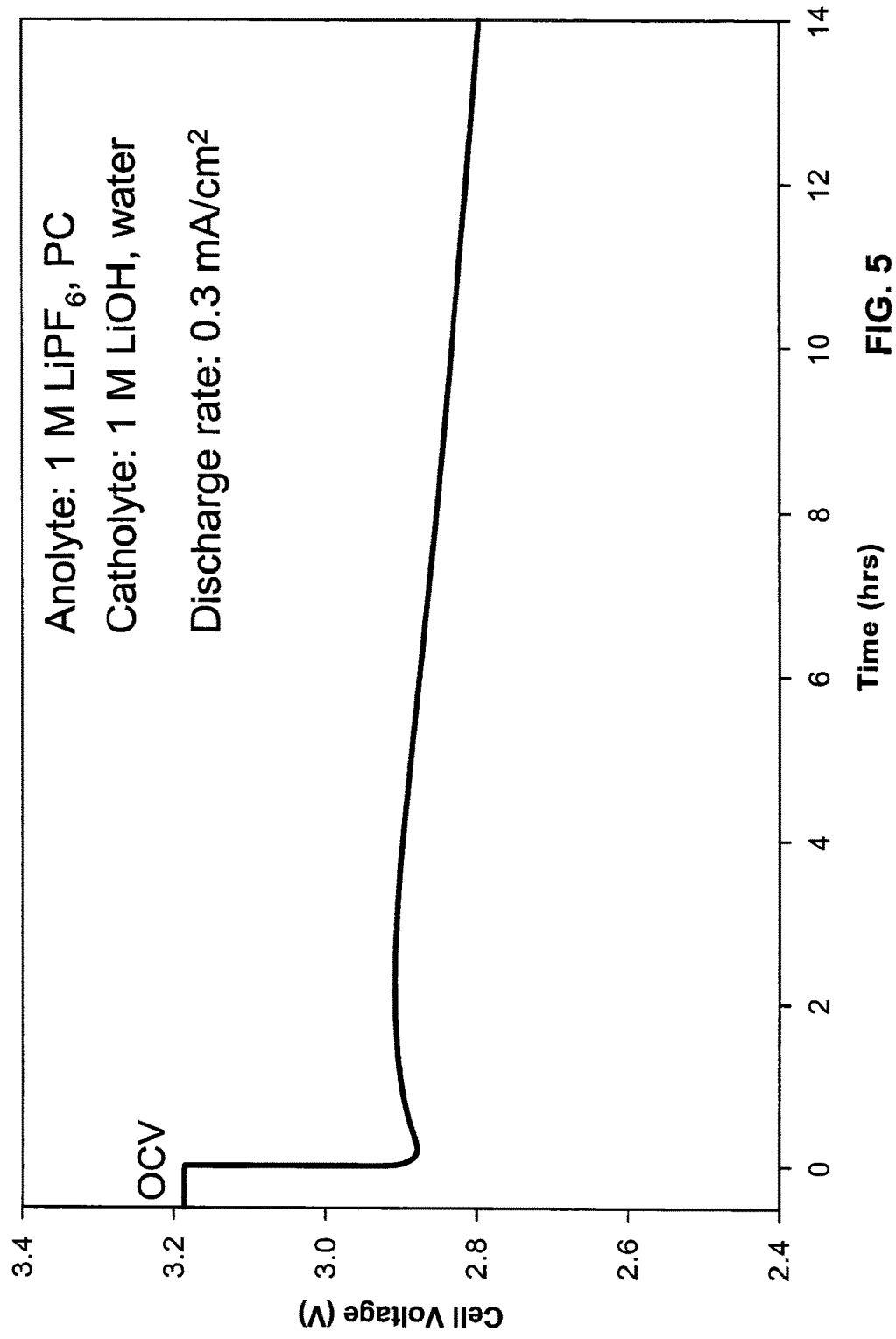

An open circuit potential of 3.2 V was observed for this cell. FIG. 5 shows discharge voltage-time curve at discharge rate of 0.3 $mA/cm^2$. The cell exhibited discharge voltage of 2.8-2.9 V. for more than 14 hrs. This result shows that good performance can be achieved for Li/air cells with solid electrolyte membrane separating aqueous catholyte and non-aqueous anolyte.

Example 3: Li-Ion Cell

Figure 6:
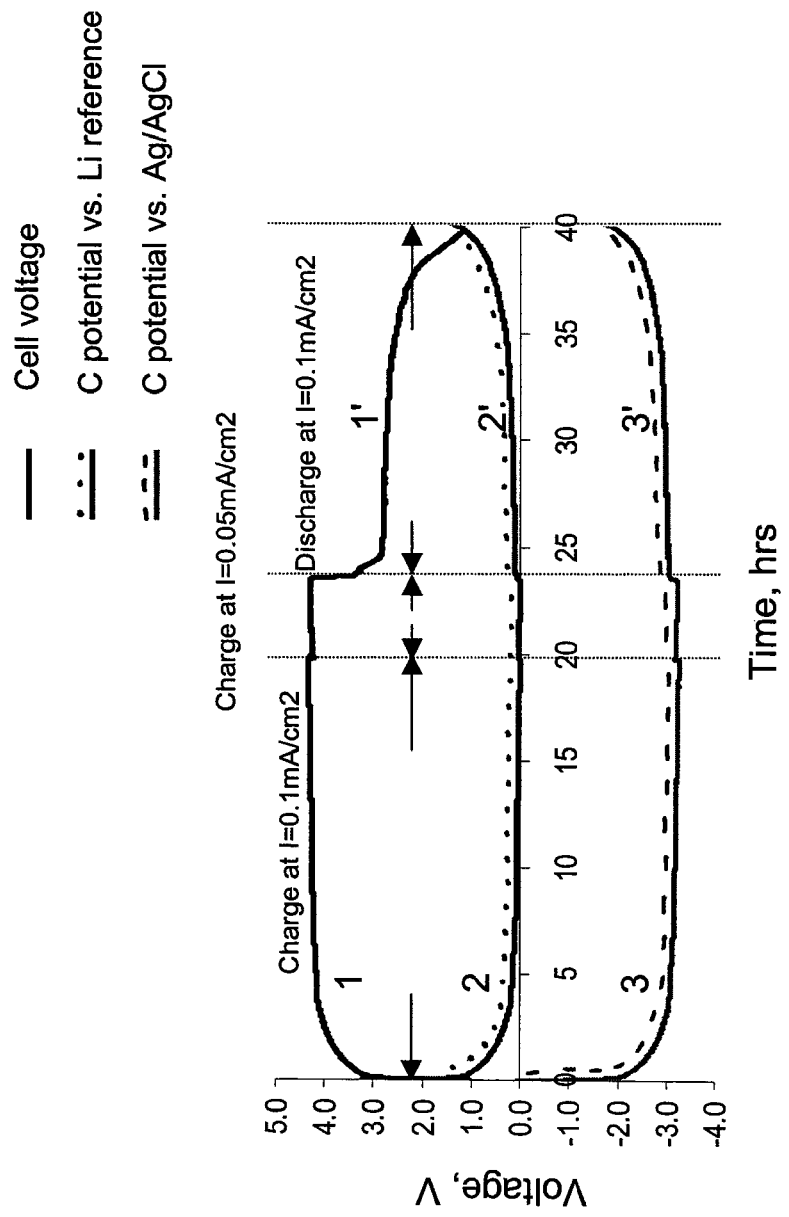

In these experiments the commercial ionically conductive glass-ceramic from OHARA Corporation was used as a membrane separating aqueous catholyte and non-aqueous anolyte. The cell structure was carbon/non-aqueous electrolyte/glass-ceramic plate/aqueous electrolyte/Pt. A commercial carbon electrode on copper substrate comprising a synthetic graphite similar to carbon electrodes commonly used in lithium-ion batteries was used as the anode. The thickness of the glass-ceramic plate was 0.3 mm. The glass-ceramic plate was fitted into an electrochemical cell by use of two o-rings such that the glass-ceramic plate was exposed to an aqueous environment from one side and a non-aqueous environment from the other side. The aqueous electrolyte comprised 2 M LiCl and 1 M HCl. Two layers of microporous Celgard separator placed on the other side of the glass-ceramic were filled with non-aqueous electrolyte comprised of 1 M $LiPF_6$ dissolved in the mixture of ethylene carbonate and dimethyl carbonate (1:1 by volume). A lithium wire reference electrode was placed between two layers of Celgard separator in order to control the potential of the carbon anode during cycling. A platinum mesh completely immersed in the 2 M LiCl, 1 M HCl solution was used as the cell cathode. An Ag/AgCl reference electrode placed in the aqueous electrolyte was used to control potential of the carbon electrode and voltage drop across the GLASS-CERAMIC plate, as well as potential of the Pt cathode during cycling. An open circuit voltage (OCV) around 1 volt was observed for this cell. The voltage difference of 3.2 volts between Li reference electrode and Ag/AgCl reference electrode closely corresponding to the thermodynamical value was observed. The cell was charged at 0.1 mA/cm2 until the carbon electrode potential reached 5 mV vs. Li reference electrode, and then at 0.05 $mA/cm^2$ using the same cutoff potential. The discharge rate was 0.1 $mA/cm^2$, and discharge cutoff potential for the carbon anode was 1.8 V vs. Li reference electrode. The data in FIG. 6 show that the cell with intercalation carbon anode and aqueous electrolyte containing Li cations can work reversibly. This is the first known example where aqueous solution has been used in Li-ion cell instead of solid lithiated oxide cathode as a source of Li ions for charging of the carbon anode.

Alternative Embodiment—Li/Water Battery and Hydrogen Generator for Fuel Cell

The use of protective architecture on active metal electrodes in accordance with the present invention allows the construction of active metal/water batteries that have negligible corrosion currents, described above. The Li/water battery has a very high theoretical energy density of 8450 Wh/kg. The cell reaction is $Li+H_2O=LiOH+½ H_2$. Although the hydrogen produced by the cell reaction is typically lost, in this embodiment of the present invention it is used to provide fuel for an ambient temperature fuel cell. The hydrogen produced can be either fed directly into the fuel cell or it can be used to recharge a metal hydride alloy for later use in a fuel cell. At least one company, Millenium Cell, makes use of the reaction of sodium borohydride with water to produce hydrogen. However, this reaction requires the use of a catalyst, and the energy produced from the chemical reaction of $NaBH_4$ and water is lost as heat.

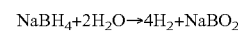

$NaBH_4 + 2H_2O \rightarrow 4H_2 + NaBO_2$

When combined with the fuel cell reaction, $H_2+O_2=H_2O$, the full cell reaction is believed to be:

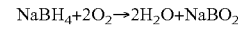

$NaBH_4 + 2O_2 \rightarrow 2H_2O + NaBO_2$

The energy density for this system can be calculated from the equivalent weight of the $NaBH_4$ reactant (38/4=9.5 grams/equiv.). The gravimetric capacity of $NaBH_4$ is 2820 mAh/g; since the voltage of the cell is about 1, the specific energy of this system is 2820 Wh/kg. If one calculates the energy density based on the end product $NaBO_2$, the energy density is lower, about 1620 Wh/kg.

In the case of the Li/water cell, the hydrogen generation proceeds by an electrochemical reaction believed described by:

$$Li+H_2O=LiOH+\tfrac{1}{2}H_2$$

Figure 7:
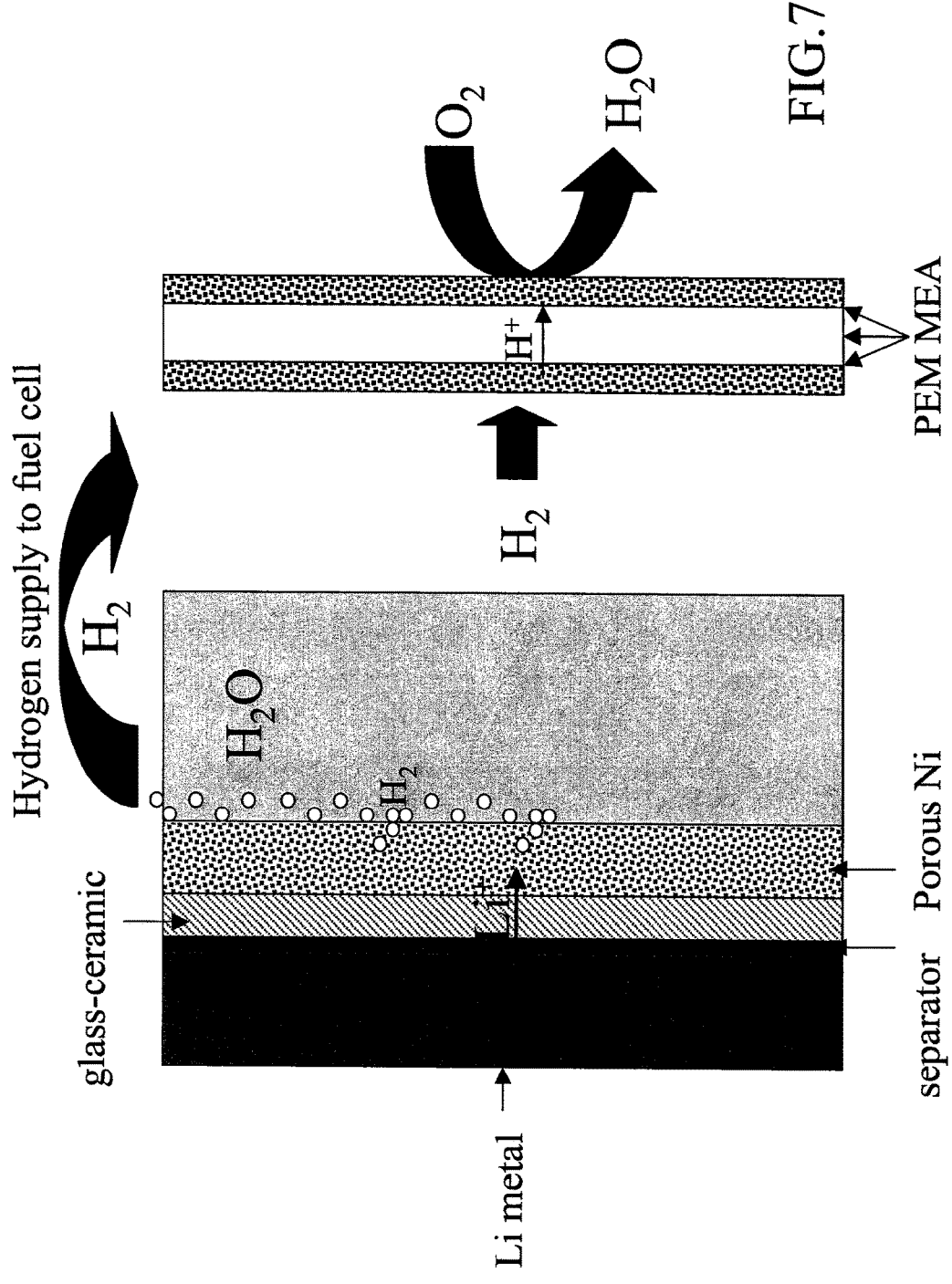
FIG. 7 illustrates a Li/water battery and hydrogen generator for a fuel cell in accordance with one embodiment of the present invention.

In this case, the energy of the chemical reaction is converted to electrical energy in a 3 volt cell, followed by conversion of the hydrogen to water in a fuel cell, giving an overall cell reaction believed described by:

$$Li+\tfrac{1}{2}H_2O+\tfrac{1}{4}O_2=LiOH$$

where all the chemical energy is theoretically converted to electrical energy. The energy density based on the lithium anode is 3830 mAh/g at a cell potential of about 3 volts which is 11,500 Wh/kg (4 times higher than $NaBH_4$). If one includes the weight of water needed for the reaction, the energy density is then 5030 Wh/kg. If the energy density is based on the weight of the discharge product, LiOH, it is then 3500 Wh/kg, or twice the energy density of the $NaBO_2$ system. This can be compared to previous concepts where the reaction of lithium metal with water to produce hydrogen has also been considered. In that scenario the energy density is lowered by a factor of three, since the majority of the energy in the $Li/H_2O$ reaction is wasted as heat, and the energy density is based on a cell potential for the $H_2/O_2$ couple (as opposed to 3 for $Li/H_2O$) which in practice is less than one. In this embodiment of the present invention, illustrated in FIG. 7, the production of hydrogen can also be carefully controlled by load across the Li/water battery, the Li/water battery has a long shelf life due to the protective membrane, and the hydrogen leaving the cell is already humidified for use in the $H_2$/air fuel cell.

CONCLUSION

Although the foregoing invention has been described in some detail for purposes of clarity of understanding, it will be apparent that certain changes and modifications may be practiced within the scope of the invention. In particular, while the invention is primarily described with reference to a lithium metal, alloy or intercalation anode, the anode may also be composed of any active metal, in particular, other alkali metals, such as sodium. It should be noted that there are many alternative ways of implementing both the process and compositions of the present invention. Accordingly, the present embodiments are to be considered as illustrative and not restrictive, and the invention is not to be limited to the details given herein.

All references cited herein are incorporated by reference for all purposes.

What is claimed is:

1. A safety enhanced lithium ion or lithium metal battery cell comprising:
   a lithium ion cathode; and
   a protected lithium anode comprising,
      an anode comprising a material selected from the group consisting of a lithium metal, lithium metal-ion, lithium metal alloy, lithium metal alloying metal, and lithium metal intercalating material; and
      a protective architecture, the protective architecture comprising a first lithium ion conducting separator layer and a second lithium ion conducting layer;
   wherein the first lithium ion conducting separator layer further comprises a lithium ion conducting anolyte, and the second lithium ion conducting layer prevents the anode from direct contact with electrochemically active material on the cathode.

2. The safety enhanced lithium ion or lithium metal battery cell of claim 1 wherein the anode comprises lithium metal.

3. The safety enhanced lithium ion or lithium metal battery cell of claim 1 wherein the anode comprises lithium metal intercalating material.

4. The safety enhanced lithium ion or lithium metal battery cell of claim 1 wherein the anode comprises lithium metal alloying metal.

5. The safety enhanced lithium ion or lithium metal battery cell of claim 4 wherein the lithium metal alloying metal is silicon or tin.

6. The safety enhanced lithium ion or lithium metal battery cell of claim 1 wherein the anolyte is a liquid electrolyte.

7. The safety enhanced lithium ion or lithium metal battery cell of claim 1 wherein the anolyte is a gel electrolyte.

8. The safety enhanced lithium ion or lithium metal battery cell of claim 1 wherein the anolyte is a polymer electrolyte.

9. The safety enhanced lithium ion or lithium metal battery cell of claim 1 wherein the first lithium ion conducting separator layer further comprises glass or ceramic particles.

10. The safety enhanced lithium ion or lithium metal battery cell of claim 9 wherein the glass or ceramic particles are reactive to lithium metal in contact to getter any shorting dendrites that grow as a result of cell cycling.

11. The safety enhanced lithium ion or lithium metal battery cell of claim 1 wherein the second lithium ion conducting layer directly contacts the lithium ion cathode.

12. The safety enhanced lithium ion or lithium metal battery cell of claim 1 wherein the lithium ion cathode is a metal oxide.

13. The safety enhanced lithium ion or lithium metal battery cell of claim 12 wherein the metal oxide comprises $LiCoO_2$.

14. The safety enhanced lithium ion or lithium metal battery cell of claim 12 wherein the metal oxide comprises $LiNiO_2$.

15. The safety enhanced lithium ion or lithium metal battery cell of claim 12 wherein the cell further comprises a liquid electrolyte in direct contact with the lithium ion cathode.

16. The safety enhanced lithium ion or lithium metal battery cell of claim 15 wherein the liquid electrolyte in direct contact with the lithium ion cathode does not contact the anode.

17. The safety enhanced lithium ion or lithium metal battery cell of claim 1 wherein the second lithium ion conducting layer is a tape cast layer.

18. The safety enhanced lithium ion or lithium metal battery cell of claim 17 wherein the tape cast layer comprises a garnet lithium ion conductor.

19. The safety enhanced lithium ion or lithium metal battery cell of claim 1 wherein the second lithium ion conducting layer comprises a garnet lithium ion conductor.

20. The safety enhanced lithium ion or lithium metal battery cell of claim 1 wherein the second lithium ion conducting layer comprises a ceramic lithium ion conductor comprising lithium titanium phosphate.

* * * * *